US008825540B2

(12) United States Patent
Kobayashi et al.

(10) Patent No.: US 8,825,540 B2
(45) Date of Patent: Sep. 2, 2014

(54) EVALUATION DEVICE FOR ENTERPRISE VALUE, EVALUATION METHOD AND RECORDING MEDIUM

(75) Inventors: Yoshimitsu Kobayashi, Tokyo (JP); Shotaro Goda, Tokyo (JP); Masayuki Waga, Tokyo (JP)

(73) Assignee: Mitsubishi Chemical Holdings, Tokyo (JP)

( * ) Notice: Subject to any disclaimer, the term of this patent is extended or adjusted under 35 U.S.C. 154(b) by 99 days.

(21) Appl. No.: 13/606,300

(22) Filed: Sep. 7, 2012

(65) Prior Publication Data

US 2013/0246304 A1 Sep. 19, 2013

(30) Foreign Application Priority Data

Sep. 30, 2011 (JP) ................................ 2011-218753
Aug. 21, 2012 (JP) ................................ 2012-182781

(51) Int. Cl.
*G06Q 10/06* (2012.01)
*G06Q 40/00* (2012.01)

(52) U.S. Cl.
CPC .......... *G06Q 40/00* (2013.01); *G06Q 10/06393* (2013.01)
USPC ...................................................... 705/36 R

(58) Field of Classification Search
USPC ......................................... 705/36 R, 35, 37
See application file for complete search history.

(56) References Cited

U.S. PATENT DOCUMENTS

| 2002/0035550 | A1 | 3/2002 | Sakurai et al. |
| 2003/0046203 | A1* | 3/2003 | Ichihari et al. ................ 705/35 |
| 2003/0069822 | A1 | 4/2003 | Ito et al. |
| 2006/0206287 | A1 | 9/2006 | Rosam et al. |
| 2009/0240562 | A1 | 9/2009 | Kohno et al. |

FOREIGN PATENT DOCUMENTS

| EP | 1 876 506 A1 | 1/2008 |
| JP | 2000-20588 | 1/2000 |
| JP | 2001-125962 | 5/2001 |
| JP | 2001-167194 | 6/2001 |
| JP | 2002-163446 | 6/2002 |
| JP | 2004-118668 | 4/2004 |
| JP | 2005-182451 | 7/2005 |
| JP | 2005-309876 | 11/2005 |
| JP | 2005-352637 | 12/2005 |
| JP | 2006-323787 | 11/2006 |
| JP | 2008-257673 | 10/2008 |
| JP | 2010-61592 | 3/2010 |

* cited by examiner

*Primary Examiner* — James A Vezeris
(74) *Attorney, Agent, or Firm* — Oblon, Spivak, McClelland, Maier & Neustadt, L.L.P.

(57) ABSTRACT

Inputs of target values and performance values of the MBA index, the MOS index and the MOS index are accepted, three axes passing through an origin and orthogonal to each other are set, target vectors and performance vectors of the enterprise value based on the respective indices are rendered on three-dimensional coordinates of which the three axes are an MBA axis, an MOT axis and an MOS axis, resources for attaining targets of the respective indices in a second evaluation period are reset based on allocation rates of an allocation table if a divergence between the target value and the performance value in a first evaluation period is large, and reset results are output.

12 Claims, 39 Drawing Sheets

FIG. 3

| INDEX | ALLOCATION | INDEX | ALLOCATED POINT |
|---|---|---|---|
| SUSTAINABILITY | 3.4 POINTS | S-1 | 1.2 POINTS |
| | | S-2 | 1.1 POINTS |
| | | S-3 | 1.1 POINTS |
| HEALTH | 3.3 POINTS | H-1 | 1.1 POINTS |
| | | H-2 | 1.1 POINTS |
| | | H-3 | 1.1 POINTS |
| COMFORT | 3.3 POINTS | C-1 | 1.1 POINTS |
| | | C-2 | 1.1 POINTS |
| | | C-3 | 1.1 POINTS |

FIG. 4

MBA INDEX

| MBA INDEX | | ALLOCATION OF POINTS TAKING ACCOUNT OF WEIGHT (MAXIMUM POINT) | TOTAL OF UNADJUSTED SCORES IN 2011 (AGAINST MAXIMUM BASIS OF 10 POINTS) | ALLOCATION OF POINTS TAKING ACCOUNT OF WEIGHT |
|---|---|---|---|---|
| ATTAINMENT RATE OF SALES PROFITS 30% (GROWTH INCLUDED) | 10 POINTS | 3 POINTS | 8 POINTS | 2.4 POINTS |
| ROA ATTAINMENT RATE 20% | 10 POINTS | 2 POINTS | 8 POINTS | 1.6 POINTS |
| D/E RATIO ATTAINMENT RATE 15% | 10 POINTS | 1.5 POINTS | 8 POINTS | 1.2 POINTS |
| PROGRESS OF TRANSFORMATION 15% | 10 POINTS | 1.5 POINTS | 8 POINTS | 1.2 POINTS |
| AGGREGATE MARKET VALUE 10% | 10 POINTS | 1 POINTS | 7 POINTS | 0.7 POINTS |
| PROFIT PER STOCK 10% | | 1 POINTS | 7 POINTS | 0.7 POINTS |
| TOTAL OF MBA INDEX (100%) | | TOTAL 10 POINTS | | 7.8 POINTS (ATTAINMENT RATE 78%) |

FIG. 5

| MOT INDEX | | ALLOCATION OF POINTS TAKING ACCOUNT OF WEIGHT (MAXIMUM BASIS POINT) | TOTAL OF UNADJUSTED SCORES IN 2011 (AGAINST MAXIMUM BASIS OF 10 POINTS) | ALLOCATION OF POINTS TAKING ACCOUNT OF WEIGHT |
|---|---|---|---|---|
| WEIGHTED PERCENTAGE IN PARENTHESES | | | | |
| RESOURCE INVESTMENT RATE INTO MANAGEMENT OF TECHNOLOGY (30%) | (I) PERSONNEL INVESTMENT RATE INTO ACTIVITY RELATED TO MANAGEMENT OF TECHNOLOGY: 3.5 POINTS<br>(II) FUND INVESTMENT RATE INTO ACTIVITY RELATED TO MANAGEMENT OF TECHNOLOGY: 3.5 POINTS<br>(III) HUMAN RESOURCE EDUCATION SCHEME: 3.0 POINTS<br>(TOTAL 10 POINTS) | 3 POINTS | 8 POINTS | 2.4 POINTS |
| PERIOD TARGET ATTAINMENT RATE OF ACTIVITY RELATED TO MANAGEMENT OF TECHNOLOGY (30%) | ATTAINMENT OF PERIOD TARGET: 10 POINTS | 3 POINTS | 8 POINTS | 2.4 POINTS |
| RATE OF OUTCOME FROM ACTIVITY RELATED TO MANAGEMENT OF TECHNOLOGY (40%) | (I) CASE OF INDUSTRIALIZING NEW TECHNOLOGY AND COMMERCIALIZING NEW PRODUCT: 2 POINTS<br>(II) OUTCOME OF INTELLECTUAL PROPERTY SUCH AS PATENT: 1 POINTS<br>(III) CASE OF BECOMING CANDIDATE FOR AWARD: 1 POINT<br>(IV) ACQUISITION OF NEW KNOW-HOW: 1 POINT<br>(V) PROGRESS OF EVALUATION OF POTENTIAL CUSTOMER: 1 POINT<br>(VI) ATTAINMENT OF AFFILIATION OF ENTERPRISE BASED ON ACTIVITY OF INTELLECTUAL PROPERTY: 1 POINT<br>(VII) ATTAINMENT OF LARGE IMPROVEMENT OF EFFICIENCY OF MANAGEMENT (INCLUDING SALES ETC): 3 POINTS<br>(TOTAL 10 POINTS) | 4 POINTS | 8 POINTS | 3.2 POINTS |
| TOTAL OF MOT INDEX (100%) | | TOTAL 10 POINTS | | TOTAL 8 POINTS (ATTAINMENT RATE 80%) |

FIG. 12

| | INDEX WITH MAXIMUM DIVERGENCE | MAGNITUDE OF DIVERGENCE | MOT | MBA | MOS |
|---|---|---|---|---|---|
| 61 | MOT | LESS THAN 4-6 | +20% | -10% | -10% |
| 62 | MOT | LESS THAN 6-8 | +25% | -15% | -10% |
| 63 | MBA | LESS THAN 4-6 | -8% | +20% | -12% |
| 64 | MBA | LESS THAN 6-8 | -10% | +25% | -15% |
| 65 | MOS | LESS THAN 4-6 | -8% | -12% | +20% |
| 66 | MOS | LESS THAN 6-8 | -10% | -15% | +25% |

FIG. 15A

| | SITUATION INFORMATION | SCALE RATIO |
|---|---|---|
| 1 | FLUCTUATION OF KEY CURRENCY EXCHANGE RATE: CASE OF OCCURRENCE OF 20% OR MORE FLUCTUATION IN ANY ONE OF YEN-DOLLAR, YEN-EURO, DOLLAR-EURO, RMB-DOLLAR | +5% |
| 2 | FLUCTUATION OF INTEREST RATE OF KEY CURRENCY: CASE OF OCCURRENCE OF 100% OR MORE FLUCTUATION IN ANY ONE OF YEN, EURO, DOLLAR, RMB | +5% |
| 3 | MAIN PRICE INCREASE RATE: CASE OF HAVING 30% OR MORE INCREASE IN JAPAN, U.S.A., CHINA, EUROPE AND BRAZIL | +5% |
| 4 | VOLATILITIES OF STOCK PRICES OF THE MAIN MARKETS: CASE OF HAVING 30% OR MORE DECREASE IN NY, LONDON, TOKYO, SINGAPORE, SHANGHAI | +5% |
| 5 | MARKET PRICES OF CRUDE OILS: CASE OF 50% OR MORE INCREASE BEING SEEN IN DUBAI, WTI AND NORTH SEA | +5% |
| 6 | FLUCTUATION OF KEY CURRENCY EXCHANGE RATE: CASE OF OCCURRENCE OF 30% OR MORE FLUCTUATION IN ANY ONE OF YEN-DOLLAR, YEN-EURO, DOLLAR-EURO, RMB-DOLLAR | +8% |
| 7 | FLUCTUATION OF INTEREST RATE OF KEY CURRENCY: CASE OF OCCURRENCE OF 140% OR MORE FLUCTUATION IN ANY ONE OF YEN, EURO, DOLLAR, RMB | +7% |
| : | : | : |

FIG. 15B

| | SITUATION INFORMATION | SCALE RATIO |
|---|---|---|
| 1 | BASIC SCIENCE INVOLVING LONG-TERM DEVELOPMENT:CASE OF ATTAINING SUBJECT IN NANOTECHNOLOGY, PHOTONIC CRYSTAL, QUANTUM COMPUTER, ETC | -10% |
| 2 | CORE TECHNOLOGY INVOLVING LONG-TERM DEVELOPMENT:CASE OF ATTAINING SUBJECT IN CATALYST, SOLAR CELL AND PROCESSOR | -10% |
| 3 | APPLICATION TECHNOLOGY INVOLVING INTERMEDIATE AND SHORT TERM DEVELOPMENT:CASE OF ATTAINING DEVELOPMENTS OF NEW PRODUCT A AND NEW PRODUCT B | -5% |
| 4 | OPERATION TECHNOLOGY INVOLVING ACCUMULATIONS OF DEVELOPMENTS ON DAILY BASIS:CASE OF OBVIATING PROBLEM OF PRODUCT A AND MANUFACTURING PRODUCT B USING RECYCLE MATERIAL | -5% |
| 5 | CASE OF NEWLY SETTING DEVELOPMENT TARGET IN BASIC SCIENCE INVOLVING LONG-TERM DEVELOPMENT | +10% |
| 6 | CASE OF NEWLY SETTING DEVELOPMENT TARGET IN CORE TECHNOLOGY INVOLVING LONG-TERM DEVELOPMENT | +10% |
| 7 | CASE OF SETTING NEW DEVELOPMENT TARGET IN APPLICATION TECHNOLOGY INVOLVING INTERMEDIATE/SHORT TERM DEVELOPMENT | +5% |
| 8 | CASE OF SETTING DEVELOPMENT TARGET IN OPERATION TECHNOLOGY INVOLVING ACCUMULATIONS OF DEVELOPMENTS ON DAILY BASIS | +5% |
| : | : | : |

FIG. 15C

| | SITUATION INFORMATION | SCALE RATIO |
|---|---|---|
| 1 | AGREEMENT ABOUT SUSTAINABILITY BEING MADE:CASE OF REACHING INTERNATIONAL AGREEMENT RECOGNIZED TO HAVE EFFECTIVENESS IN ENERGY, RESOURCES AND POPULATIONS | -10% |
| 2 | SOLUTION OF SUBJECT:CASE THAT ONE OF ITEMS RELATED TO SUSTAINABILITY IS DEEMED TO BE SOLVED | -10% |
| 3 | ADDITION OF SUBJECT:CASE THAT SUBJECT ABOUT ITEM RELATED TO SUSTAINABILITY DEEMED TO BE ADDED | +10% |
| : | : | : |

FIG. 19

| SITUATION | KEYWORD |
|---|---|
| SITUATION 1 | ANATHERMAL, EXHAUSTION OF OIL, OZONE HOLE… |
| SITUATION 2 | DENOMINATION, SIMULTANEOUS DROP IN GLOBAL STOCK PRICES… |
| SITUATION 3 | DEFICIENCY OF RESEARCHERS, GENERATION EDUCATED WITH LATITUDE, DE-INDUSTRIALIZATION… |
| ⋮ | ⋮ |

FIG. 20

| SITUATION | MBA | MOT | MOS |
|---|---|---|---|
| SITUATION 1 | 0% | +5% | +10% |
| SITUATION 2 | +5% | 0% | 0% |
| SITUATION 3 | −5% | +50% | +5% |
| SITUATION 4 | 0% | 0% | 0% |
| ⋮ | ⋮ | ⋮ | ⋮ |

| FISCAL YEAR | COLOR |
|---|---|
| N | RED |
| N−1 | BLUE |
| N−2 | GREEN |
| N−3 | YELLOW |
| ⋮ | ⋮ |
| ⋮ | ⋮ |
|  |  |

EVALUATION DEVICE FOR ENTERPRISE VALUE, EVALUATION METHOD AND RECORDING MEDIUM

CROSS-REFERENCE TO RELATED APPLICATION

This application is based upon and claims the benefit of prior Japanese Patent Application No. 2011-218753 filed on Sep. 30, 2011, and Japanese Patent Application No. 2012-182781 filed on Aug. 21, 2012, the entire contents of which are incorporated herein by reference.

BACKGROUND OF THE INVENTION

The present invention relates to a technology for evaluating an enterprise value.

Activities of an enterprise have hitherto been evaluated depending on whether an enterprise value indicated by a financial indicator was raised or not.

Therefore, an MBA (Master of Business Administration) index puts an emphasis on how much profits, assets, shares, etc are increased in management of the enterprise.

DOCUMENTS OF PRIOR ARTS

Patent Document

[Patent document 1] Japanese Patent Application Laid-Open Publication No. 2000-20588
[Patent document 2] Japanese Patent Application Laid-Open Publication No. 2001-167194
[Patent document 3] Japanese Patent Application Laid-Open Publication No. 2005-182451

SUMMARY OF THE INVENTION

In the case of conducting the management of the enterprise in the pursuit of only profits, however, expansions of productions linked directly to increases in profits are accelerated, while activities such as recycling resources and processing refuses are restrained in contrast with augmenting the profits. As a result, failures such as depletions of natural resources and environmental pollutions are brought about, with the result that the activities of the enterprises become hard to continue.

Hence, there arises a necessity for an MOS (Management of Sustainability) index for performing sustainable activities of the enterprises without bringing about the failures by restraining loads on the environment that occur due to the activities of the enterprises. For example, if woods are used as materials, a felling quantity of the woods is counter-balanced with a quantity of afforestation in a way that utilizes the recycle raw materials and planting trees, thereby enabling the quantities of the resources to be maintained and the sustainable use to be done.

Moreover, it is of importance to create innovations for the sustainable developments of the enterprises. Then, the creations of the innovations entail a long-term strategy for educating human resources, investing in the developments and promoting technologies such as industry-academia collaboration, i.e., require a so-called MOT (Management of Technology) index.

If implementations of excessive investments in the environment and the innovations deteriorate business achievements of the enterprises, however, it follows that the enterprises are disabled from continuing their activities.

Such being the case, the present applicant proposes for multi-dimensionally evaluating the enterprise value by use of three indices such as an MBA index, an MOT index and a MOS index or by use of four indices including a concept of time added to these three indices and performing the activities of the enterprise based on the multi-dimensional evaluations. Herein, the MBA index is an index calculated based on a predetermined value related to business achievements of the enterprise.

The MOT index is an index calculated based on a predetermined value related to the innovation of the technology. Further, the MOS index is an index calculated based on a predetermined value related to social responsibility required for the sustainable activities of the enterprise.

An evaluation device according to an embodiment of the present invention includes:

a target accepting unit to accept inputting a target value of an MBA index defined as an index calculated based on a predetermined value related to business achievements of an enterprise, a target value of an MOT index defined as an index calculated based on a predetermined value related to an innovation of technology and a target value of an MOS index defined as an index calculated based on a predetermined value related to social responsibility required for sustainable activities of the enterprise;

an evaluation unit to set three axes passing through an origin and orthogonal to each other, set the three axes as an MBA axis, an MOT axis and an MOS axis, take a target value of the MBA index, a target value of the MOT index and a target value of the MOS index on the MBA axis, the MOT axis and the MOS axis, set an MBA target vector extending from the origin up to the target value of the MBA index, an MOT target vector extending from the origin up to the target value of the MOT index and an MOS target vector extending from the origin up to the target value of the MOS index, and obtain a synthesized vector of the MBA target vector, the MOT target vector and the MOS target vector as a target vector of the enterprise value; and an output control unit to render the target vector of the enterprise value on a three-dimensional coordinates defined by the MBA axis, the MOT axis and the MOS axis.

Further, An evaluation device according to another embodiment of the present invention includes:

a target accepting unit to accept inputting a target value of an MBA index calculated based on a predetermined value related to a business achievement of an enterprise and containing at least one of an operating profit attainment rate, a ROA (Return On Asset) attainment rate, a D/E (Debt/Equity) ratio attainment rate, a transformation attainment rate, a profitability per stock and an total market value, a target value of an MOT index containing at least one of a resource investment rate into management of technology, a period target attainment rate of an activity related to the management of technology and an outcome rate from the activity related to the management of technology, a target value of an MOS index containing a comfort index defined as a degree of comfortability, including a degree of satisfaction of a stakeholder of the enterprise, to which an enterprise activity contributes, and a sustainability index defined as a determined value of how much a sustainable enterprise activity affects the environment;

a performance accepting unit to accept inputting a performance value of the MBA index, a performance value of the MOT index and a performance value of the MOS index;

an evaluation unit to set three axes passing through an origin and orthogonal to each other, set the three axes as an MBA axis, an MOT axis and an MOS axis, take a target value of the MBA index, a target value of the MOT index and a target value of the MOS index on the MBA axis, the MOT axis and the MOS axis, set an MBA target vector extending from the origin up to the target value of the MBA index, an MOT target vector extending from the origin up to the target value of the MOT index and an MOS target vector extending from the origin up to the target value of the MOS index, obtain a synthesized vector of the MBA target vector, the MOT target vector and the MOS target vector as a target vector of the enterprise value, further take a performance value of the MBA index, a performance value of the MOT index and a performance value of the MOS index on the MBA axis, the MOT axis and the MOS axis, set an MBA performance vector extending from the origin up to the performance value of the MBA index, an MOT performance vector extending from the origin up to the performance value of the MOT index and an MOS performance vector extending from the origin up to the performance value of the MOS index, obtain a synthesized vector of the MBA performance vector, the MOT performance vector and the MOS performance vector as a performance vector of the enterprise value, and obtain a target vector of the enterprise value and a performance vector of the enterprise value with respect to a plurality of evaluation periods having a predetermined length, each of the plurality of evaluation period being different in time, respectively;

a storage unit to store with an allocation table in which to set allocation rates associated with a difference between the target value and the performance value of the MBA index, a difference between the target value and the performance value of the MOT index and a difference between the target value and the performance value of the MOS index;

a resource allocation setting unit to set one evaluation period in the plurality of evaluation periods as a first evaluation period, set an evaluation period next to the first evaluation period as a second evaluation period, increase the resource value set for attaining the target at the allocation rate given in the allocation table with respect to the index exhibiting the maximum difference between the performance value and the target value among the MBA index, the MOT index and the MOS index of the first evaluation period if a distance between a tip of the performance vector and a tip of the target vector of the enterprise value in the first evaluation period diverges to a degree equal to or larger than the predetermined value, and reset each resource value by reducing the resource value preset with respect to the index exhibiting the minimum difference or this resource value preset and a resource value preset with respect to the index other than the index exhibiting the maximum difference and the index exhibiting the minimum difference at the allocation rate given in the allocation table; and an output control unit to display transitions of the performance vector by rendering the target vectors of the enterprise value and the performance vectors of the enterprise value that are obtained with respect to the plurality of evaluation periods on three-dimensional coordinates defined by the MBA axis, the MOT axis and the MOS axis, and output the reset results of the resource allocation setting unit.

Still further, An evaluation method according to the present invention is a method by which a computer executes:

accepts inputting a target value of an MBA index calculated based on a predetermined value related to a business achievement of an enterprise and containing at least one of an operating profit attainment rate, an ROA (Return On Asset) attainment rate, a D/E (Debt/Equity) ratio attainment rate, a transformation attainment rate, a profitability per stock and an total market value, a target value of an MOT index containing at least one of a resource investment rate into management of technology, a period target attainment rate of an activity related to the management of technology and an outcome rate from the activity related to the management of technology, a target value of an MOS index containing a comfort index defined as a degree of comfortability, including a degree of satisfaction of a stakeholder of the enterprise, to which an enterprise activity contributes, and a sustainability index defined as a determined value of how much a sustainable enterprise activity affects the environment;

accepts inputting a performance value of the MBA index, a performance value of the MOT index and a performance value of the MOS index;

sets three axes passing through an origin and orthogonal to each other, set the three axes as an MBA axis, an MOT axis and an MOS axis, take a target value of the MBA index, a target value of the MOT index and a target value of the MOS index on the MBA axis, the MOT axis and the MOS axis, set an MBA target vector extending from the origin up to the target value of the MBA index, an MOT target vector extending from the origin up to the target value of the MOT index and an MOS target vector extending from the origin up to the target value of the MOS index, obtain a synthesized vector of the MBA target vector, the MOT target vector and the MOS target vector as a target vector of the enterprise value, further take a performance value of the MBA index, a performance value of the MOT index and a performance value of the MOS index on the MBA axis, the MOT axis and the MOS axis, set an MBA performance vector extending from the origin up to the performance value of the MBA index, an MOT performance vector extending from the origin up to the performance value of the MOT index and an MOS performance vector extending from the origin up to the performance value of the MOS index, obtain a synthesized vector of the MBA performance vector, the MOT performance vector and the MOS performance vector as a performance vector of the enterprise value, and obtain a target vector of the enterprise value and a performance vector of the enterprise value with respect to a plurality of evaluation periods having a predetermined length, each of the plurality of evaluation period being different in time, respectively;

stores an allocation table in which to set allocation rates associated with a difference between the target value and the performance value of the MBA index, a difference between the target value and the performance value of the MOT index and a difference between the target value and the performance value of the MOS index;

sets one evaluation period in the plurality of evaluation periods as a first evaluation period, set an evaluation period next to the first evaluation period as a second evaluation period, increase the resource value set for attaining the target at the allocation rate given in the allocation table with respect to the index exhibiting the maximum difference between the performance value and the target value among the MBA index, the MOT index and the MOS index of the first evaluation period if a distance between a tip of the performance vector and a tip of the target vector of the enterprise value in the first evaluation period diverges to a degree equal to or larger than the predetermined value, and reset each resource value by reducing the resource value preset with respect to the index exhibiting the minimum difference or this resource value preset and a resource value preset with respect to the index other than the index exhibiting the maximum difference and the index exhibiting the minimum difference at the allocation rate given in the allocation table; and displays a transition of the performance vector by rendering the target vectors of the enterprise value and the performance vectors of the enterprise value that are obtained with respect to the plurality of evaluation periods on three-dimensional coordinates defined by the MBA axis, the MOT axis and the MOS axis, and output the reset results.

Yet further, the present invention may be an evaluation program for making a computer execute the evaluation method. Still yet further, the present invention may also be a non-transitory recoding medium recorded with this evaluation program readable by the computer. The computer is made to read the program from this recording medium and to execute the program, thereby enabling functions thereof to be provided.

Herein, the non-transitory computer-readable recording medium connotes a recording medium capable of accumulating information such as data and programs electrically, magnetically, optically, mechanically or by chemical action, which can be read from the computer.

Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the recording mediums fixed within the computer.

BRIEF DESCRIPTION OF THE SEVERAL VIEWS OF DRAWINGS

FIG. 3 is a diagram illustrating how points of a sustainability index, a health index and a comfort index, which build up the MOS index, are allocated;

FIG. 4 is a diagram illustrating how points of respective subdivided indices, which build up the MBA index, are allocated;

FIG. 5 is a diagram illustrating how points of respective subdivided indices, which build up the MOT index, are allocated;

FIG. 12 is a diagram illustrating an example of an allocation table;

FIGS. 15A-15C are diagrams each depicting an example of a weight table;

FIG. 19 is a diagram illustrating an example of a table in which situations and keywords are associated with each other;

FIG. 20 is a diagram illustrating an example of the weight table;

DETAILED DESCRIPTION OF THE INVENTION

Figure 1:
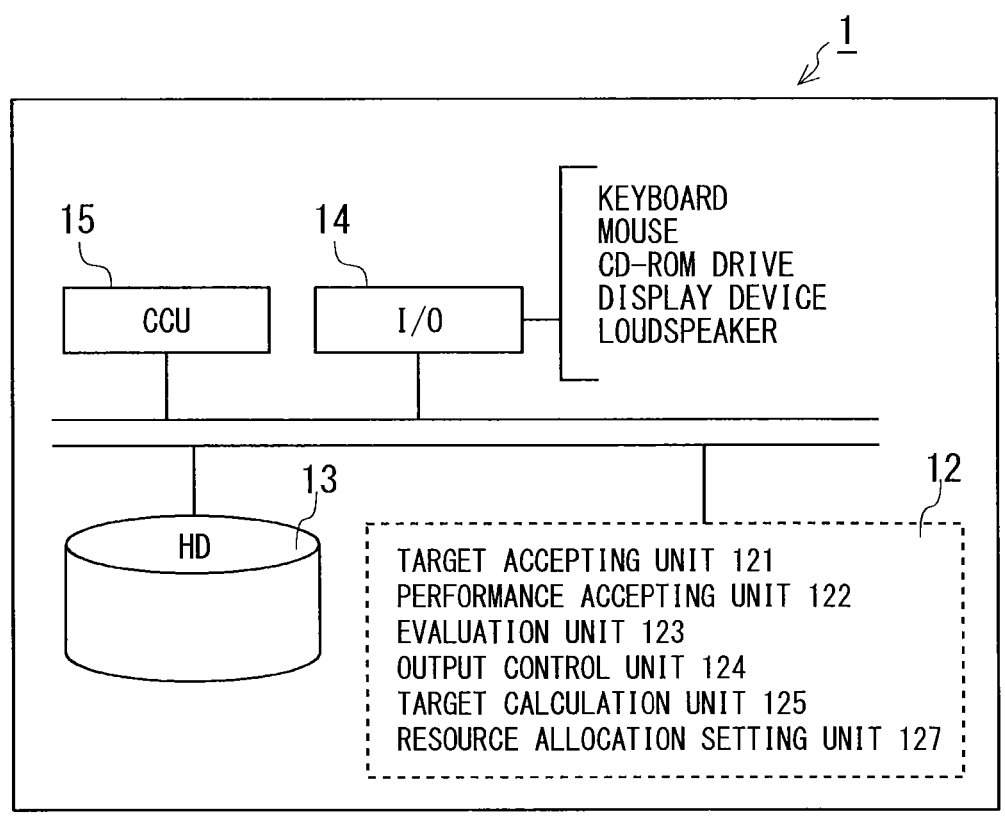
FIG. 1 is a schematic diagram of architecture of an evaluation device of an enterprise value in a first embodiment.

Embodiments for carrying the present invention will hereinafter be described with reference to the drawings. Configurations in the following embodiments are exemplifications, and the present invention is not limited to the configurations in the embodiments.

<First Embodiment>

An evaluation device in the first embodiment provides multi-dimensional evaluations targeted at supporting management by investing proper management resources to acquire fixed outcomes even when the management encounters whatever environment. An entrepreneur avoids deviations and excursions in company management by investing the management resources into profiles indicated by a MOT index, a MOS index as well as by a MBA index on the basis of the multi-dimensional evaluations made by the evaluation device according to the first embodiment.

In other words, the evaluation device according to the first embodiment can be said to be "the system for conducting the well-balanced management at all times" and can, to be specific, prevent especially the following two instances.

An instance (i) is that the profiles indicated by the MOT index and the MOS index are disregarded because business achievements indicated by the MBA index are too satisfactory.

Another instance (ii) is that the business achievements indicated by the MBA index are poor, the investment of the management resources into the profiles indicated by the MOT index and the MOS index is stopped, and the investment of the management resources is concentrated on only the profile indicated by the MBA index.

The evaluation device performs, e.g., the following procedures in order to support the investment of the proper management resources into the three profiles at all times, i.e., support the well-balanced management at all times while avoiding the extreme instances described above.

(1) At first, targets and performances of the MBA index, the MOT index and the MOS index are plotted on different-dimensional three axes orthogonal to each other.

(2) The MBA index, the MOT index and the MOS index are treated as different-dimensional values.

(3) "Target values" and "performance values" of the MBA index, the MOT index and the MOS index are plotted on the respective axes, in which an attainment rate of the target is evaluated, and the evaluated value is reflected in setting a "next target value".

(4) A "management space-time" is generated by orthogonalizing the three axes. Then, a three-dimensional synthesized vector is plotted on the "management space-time" by synthesizing three vectors, i.e., an MBA target vector from an origin to the target value on the MBA axis, an MOT target vector from the origin to the target value on the MOT axis and an MOS target vector from the origin to the target value on the MOS axis. The synthesized vector based on the three target values is defined as a "target vector of enterprise value", and similarly the synthesized vector based on the three performance values is defined as a "performance vector of enterprise value".

(5) The evaluation is conducted by comparing the numerical values, i.e., the target values and the performance values on the respective axes, however, the three-dimensional evaluation within the management space-time is performed by making a comparison between "lengths" and a comparison between "directions" of the "target vectors" and the "performance vectors".

A management technique based on the evaluation using the procedures described above is called "three-dimensional management", while an information system for supporting the "three-dimensional management" is called an "annual monitoring system".

Then, each of the MBA index, the MOT index and the MOS index is not subsistence expressed on the absolute axis that is semipermanently fixed, but has a possibility of causing an essential alteration in a lapse of the time. Accordingly, the respective axes are reexamined on an annual basis and may be modified as the necessity arises.

Hence, the management technique based on the evaluation made by the evaluation device may be what reflects a lapse of time and a qualitative change of the axis due to this time lapse in the evaluation on the occasion of plotting the vectors and making the evaluation on a time-lapse basis. A management technique based on the evaluation in which the qualitative changes of the three axes due to the lapse of time described above are reflected, is called a "four-dimensional management", while an information system that supports the "four-dimensional management" is called a "time-lapse monitoring system".

<Architecture of Evaluation Device>

FIG. 1 is a schematic diagram of architecture of an evaluation device 1 of an enterprise value in the first embodiment. As illustrated in FIG. 1, the evaluation device 1 includes an arithmetic processing unit 12 configured to include a CPU (Central Processing Unit), a main memory, etc within a body. Further, the evaluation device 1 is a computer including a storage unit (hard disk) 13 stored with data and software for the arithmetic process, an input/output (I/O) port 14, a communication control unit (CCU) 15, etc.

The I/O port 14 is an interface to which input devices such as a keyboard, a mouse, a CD-ROM drive and a reading device of a recording medium like a memory card reader and output devices such as a display device and a printer are properly connected.

The CCU 15 performs communications with other computers via a network.

The storage unit 13 is preinstalled with an operating system (OS) and application software (an evaluation program etc). Further, the storage unit 13 gets stored with input data of the performance values and the target values of enterprise activities and data of processing results etc of the arithmetic processing unit 12.

The arithmetic processing unit 12, which is configured to include the CPU, the memory, etc, properly reads the OS and the application programs from the storage unit 13, then executes the OS and the application programs, and arithmetically processes items of information inputted from the I/O port 14 and the CCU 15 and items of information read from the storage unit 13. This being done, the arithmetic processing unit 12 functions as a target accepting unit 121, a performance accepting unit 122, an evaluation unit 123, a resource allocation setting unit 127 and an output control unit 124.

The target accepting unit 121 accepts inputting the target values as input data via the I/O port 14 by user's operations on the keyboard and the mouse and reading the data from the storage medium and as reception data via the CCU 15. Herein, the target value is a target value of the MBA index defined as an index calculated based on a predetermined value pertaining to the business achievement of the enterprise. Further, the target value may be a target value of the MOT index defined as an index calculated based on a predetermined value related to a technical innovation and may also be a target value of the MOS index defined as an index calculated based on a predetermined value concerning social responsibility requested in terms of sustainable activity performed by the enterprise.

The performance accepting unit 122 accepts inputting the performance value of the MBA index, the performance value of the MOT index and the performance value of the MOS index. For example, the performance accepting unit 122 accepts inputting the respective performance values as the input data via the I/O port 14 by the user's operations on the keyboard and the mouse and reading the data from the storage medium. Moreover, the performance accepting unit 122 accepts inputting the respective performance values as the reception data via the CCU 15.

The evaluation unit 123 sets the three axes passing through the origin and orthogonal to each other and defines these three axes as an MBA axis, an MOT axis and an MOS axis. The evaluation unit 123 takes the target value of the MBA index, the target value of the MOT index and the target value of the MOS index on the MBA axis, the MOT axis and the MOS axis, respectively. The evaluation unit 123 sets an MBA target vector from the origin to the target value of the MBA index, an MOT target vector from the origin to the target value of the MOT index and an MOS target vector from the origin to the target value of the MOS index. Then, the evaluation unit 123 obtains, as the target vector of enterprise value, the synthesized vector of the MBA target vector, the MOT target vector and the MOS target vector.

The resource allocation setting unit 127, if the evaluation unit 123 issues an alarm because of the evaluation being poorer than a predetermined state, sets resource allocations by changing values of the resources preset for attaining the targets with respect to the MBA index, the MOT index and the MOS index. For example, the resource allocation setting unit 127, if a distance between a tip of the target vector of the enterprise value and a tip of the performance vector of the enterprise value diverges to the degree equal to or larger than a predetermined value, sets the resource allocations. Herein, the resource allocation setting unit 127 increases, at a predetermined rate, a value of the resource that is set for attaining the target beforehand with respect to the index exhibiting the maximum divergence of the performance value from the target value in the MBA index, the MOT index and the MOS index. Then, the resource allocation setting unit 127 sets the resource allocation by reducing the increased value from the preset resource value with respect to the index exhibiting the minimum divergence. Alternatively, the resource allocation setting unit 127 sets the resource allocation by reducing the increased value from the preset resource value with respect to the index exhibiting the minimum divergence and from the preset resource value with respect to the index excluding the index having the maximum divergence and the index having the minimum divergence. Further, in the case of making a four-dimensional evaluation with an addition of "time", the resource allocation setting unit 127 may, if the distance between the tip of the performance vector and the tip of the target vector of the enterprise value diverges to a degree equal to or larger than the predetermined value in one evaluation period in a plurality of evaluation periods, set again the resource allocation for the next evaluation period on the basis of this deviation.

The target calculation unit 125 calculates, based on the target value of the MOT index after a lapse of a predetermined period, the target value of the MOT index for each unit period in the case of segmenting the predetermined period into a plurality of unit periods. Further, the target calculation unit 125 calculates, based on the target value of the MOS index after the lapse of the predetermined period, the target value of the MOS index for each unit period in the case of segmenting the predetermined period into the plurality of unit periods. Still further, the target calculation unit 125 calculates, based on the target value of the MBA index after the lapse of the predetermined period, the target value of the MBA index for each unit period in the case of segmenting the predetermined period into the plurality of unit periods.

The output control unit 124 renders the target vectors of the enterprise value on the three-dimensional coordinates defined by the MBA index, the MOT index and the MOS index in a way that displays the data on the display device and outputs a print from the printer. Moreover, the output control unit 124 may write electronic data for rendering the target vectors to the storage medium and may also output the data to other systems by transmission.

Figure 2:
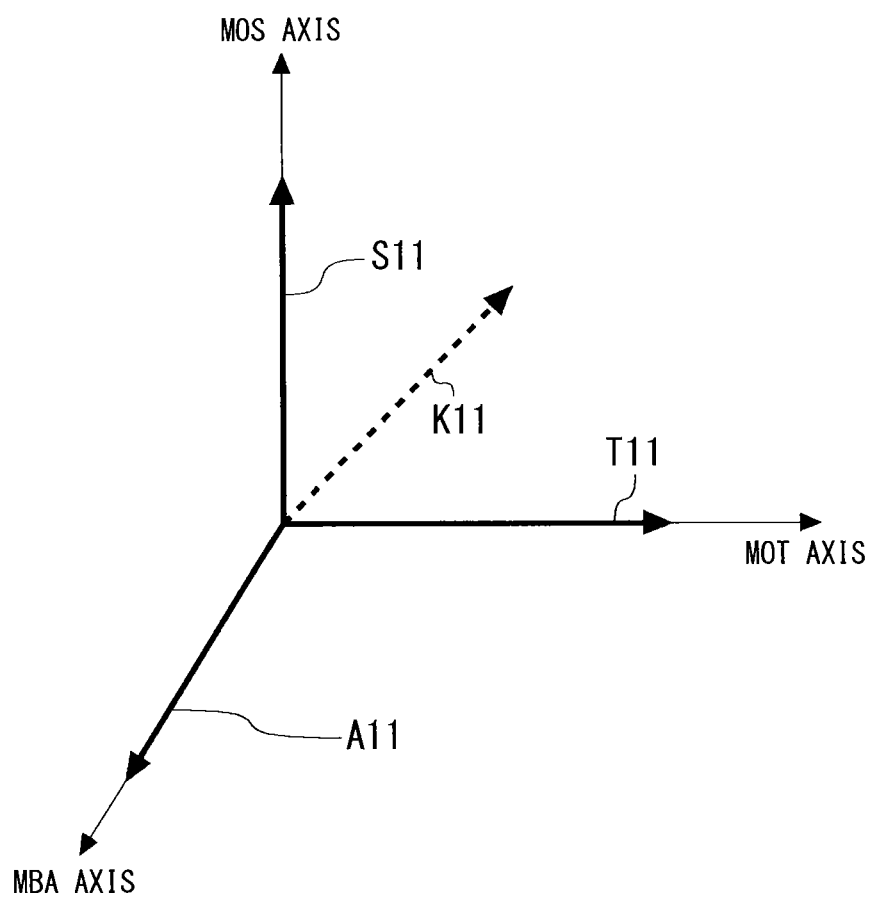
FIG. 2 is a diagram illustrating an example of rendering target vectors of the enterprise value on three-dimensional coordinates.

FIG. 2 illustrates an example of rendering the target vectors of the enterprise value on the three-dimensional coordinates. In FIG. 2, an arrow T11 represents an MOT target vector on the MOT axis, an arrow S11 represents an MOS target vector on the MOS axis, and an arrow A11 represents an MBA target vector on the MBA axis.

Then, the output control unit 124 obtains, as the target vector of the enterprise value, the synthesized vector of the MBA target vector, the MOT target vector and the MOS target vector, and displays the synthesized vector as indicated by an arrow K11 on the three-dimensional coordinates in FIG. 2. Thus, the output control unit 124 expresses the enterprise value as the vector on the three-dimensional coordinates, thereby enabling a directivity etc of the enterprise activity to be confirmed.

<Descriptions of Respective Indices>

§1. The target value of the MOS index includes a sustainability index and a comfort index and may further include a health index. Herein, the sustainability index is defined as a target value for restraining a degree of how much the enterprise activity affects the environment down to a sustainable degree by way of the target value of the sustainability of the enterprise activity. Further, the comfort index is a value containing a target of such a degree that the enterprise activity contributes to comfortability by way of the target value of the comfortability. The target value of the MOS index may further include the health index representing a target of a degree of contribution to the health of the enterprise activity by way of the target value of the health.

Moreover, the target value of the sustainability normally includes at least of one of a target value of a reduction quantity of an environmental load and a target value of a consumption restraint quantity of the resources, preferably includes both of the target values and more preferably includes a target value related to a CSR (Corporate Social Responsibility) in procuration. Moreover, the target value of the sustainability preferably includes a target value of sales proceeds of a product contributing to the comfort as the target value of the comfortability, a target value of a degree of satisfaction of a stakeholder and a target value of safety.

Furthermore, the target value of the comfortability normally includes a target value of a reliability of the enterprise, and further preferably includes at least one of a target value of the sales proceeds of the product contributing to the comfort, a target value of the degree of satisfaction of the stakeholder and an occurrence rate of a predetermined accident.

Then, the target value of the health includes at least one of a target value of a degree of contribution to curing a disease and a target value pertaining a prevention/early detection, and further preferably includes a target value of a reduction quantity of medical payments.

Moreover, the target value of the health preferably includes a target value for promoting maintenance of the health or a target value for prompting a disease preventive activity.

In the first embodiment, the MOS index has a plurality of items about the sustainability index, the comfort index and the health index, then a point is added if satisfying the item, and the points are totalized into the index.

The sustainability index is defined as an index aiming at contributing to sustaining the global environment and is specifically exemplified as follows:

(S-1) an index related to a productive activity of an evaluation target company itself;

(S-2) an index pertaining to the product; and (S-3) an index of procurement-related materials such as raw materials.

Herein, the index (S-1) related to the productive activity of the evaluation target company itself is exemplified by conversion into an environment-harmonized raw fuels and raw materials, increasing usage efficiency of the resources and the energy in a way that enhances efficiency of a production process, promoting the recycle and restraining occurrences of environmentally hazardous substances, e.g., carbon dioxide, nitrogen oxides, sulfur oxides, soot and dust, etc. The index (S-2) related to the product is exemplified such as saving the energy on the customer side by manufacturing and selling energy saving products, and decreasing the consumption of the resources in the way of reducing demands for replacements by increasing a life-time of the product. The index (S-3) related to the procurement of the raw materials is exemplified such as increasing the usage efficiency of the raw fuels and the raw materials with a small amount of carbon footprint, increasing the usage efficiency of the raw fuel manufactured from a recyclable material, using a product with an eco-mark and procuring the ecological raw materials.

The sustainability index can involve adopting one of these indices (S-1 through S-3) and adopting a well-balanced combination of a plurality of indices. Incidentally, in the case of adopting one index, it is preferable to restrain the occurrence quantity of the carbon dioxide, improve the usage efficiency of the energy and promote recycling, and more preferably these two or more items are adopted. It is more preferable to take the well-balanced combination of the plurality of indices than being limited to one index. In this case, if a form of the entrepreneur is a manufacturer, it is preferable to use one or more indices related to each of the productive activity and the product. Moreover, it is preferable to add the index pertaining to the procurement.

The enterprise activities embrace so-called CSRs (Corporate Social Responsibilities) activity which elements such as the human right as well as contents related to the global environment, and the sustainability index may include an index pertaining to the CSRs activity.

To give an example of combining these elements, for instance, the sustainability index is exemplified such as reducing the environmentally hazardous substances, restraining the occurrence of the carbon dioxide on the customer side through the products, improving the usage quantity of the raw fuels and the raw materials manufactured from the recyclable materials and increasing the efficiency of the production process. These indices involve setting the target values to be attained and schemes for attaining the target values, respectively.

The setting of specific target values is that a reduction target values are set as below with respect to, e.g., the item S-1 of the sustainability index.

1. 2,000,000 tons of greenhouse effect gas
2. 2,000 tons of NOx (nitrogen oxides)
3. 500 tons of SOx (sulfur oxides)
4. 50 tons of soot and dusts
5. 200 tons of PRTR (Pollutant Release and Transfer Register) research object substances The points are calculated corresponding to a rate of satisfying these conditions.

The health index is an index aiming at a contribution to, e.g., a healthy lifetime spent by a person. To be specific, the health index is exemplified such as contributing to improving a birthrate, promoting development/public hygiene, promoting the maintenance of health, promoting disease preventive activities, promoting unification of physical information and promoting an early detection of a disease etc. The health index is further exemplified such as improving a recovery rate of serious diseases, contributing to a reduction in medical payments, improving a medical environment, supporting educations of medical science, contributing to a recovery of physical functions, promoting anti-aging, and contributing to providing safe foods.

The health index can involve adopting one of these indices and also taking well-balanced adoption of a plurality of indices. The well-balanced combination of the plurality of indices is more preferably than being limited to one index. If a business form of the entrepreneur is a business of pharmaceutical, it is preferable that the health index involves using one or more indices selected from within promoting the maintenance of health, promoting disease preventive activities, improving the recovery rate of serious diseases and contributing to the reduction in medical payments.

To give a more specific example, as for the item H-1 of the health index, the conditions are set as follows.

1. An increment count of a numerical value obtained by multiplying an unsatisfactory degree of curing (unsatisfactory degree of curing=1−satisfactory degree of curing).

2. An increase in number of patients of diseases specified as the serious diseases who undergo dosing treatments.

Points are calculated corresponding to a rate of satisfying these conditions.

The comfort index is an index aiming at contributing to the comfortable lives provided by people, however, elements that provide a sense of security and safety by getting rid of uneasiness are also considered comfortable, and therefore what is associated with these elements is also added to the comfort index.

To give specific examples of the comfort index, the index directly related to products and services is exemplified such as providing the product and the service with improved convenience, providing the product and the service with improved durability and safety, and providing the product and the service with improved or more enriched functions. Moreover, the comfort index is exemplified such as providing the product and the service with which meet a variety of requests, providing the product and the service that are felt pleasant by the five senses as in the case of being felt nice by touching, providing the pure or clean product and providing the product and the service that are felt safe. Furthermore, the index pertaining to a reduction in time till providing these products and services is exemplified by improving an occupancy ratio of a new commercial product to the whole.

Still further, the comfort index is exemplified by an index for improving the satisfaction of related parties undergoing influence from the enterprise and an index for obviating the dissatisfaction. For example, the index is exemplified such as improving a stock price, a total market value and a dividend rate in order to raise the degree of satisfaction of a stockholder, decreasing an occurrence rate of a claim and speeding up a response to the claim in order to raise the degree of satisfaction of the customer. Further, an improvement of an index related to an environment of duty is given such as increasing an acquisition ratio of a childcare leave for raising the degree of satisfaction of an employee. As for the degree of satisfaction of the related parties of the enterprise, ranking is provided by a private survey institution, and, though "NICE" provided by Nikkei Research Inc. is taken for example, the comfort index can be exemplified also by improving this ranking.

Moreover, the index is exemplified such as decreasing occurrence rates of a physical injury, an accident to stop the operation, and an environmental accident of leakage, confirming the safety of the product and revealing a confirmed result to the public.

One of these indices can be adopted and set as the comfort index, and a plurality of indices can be also adopted in well balance and set as the comfort index on the whole. In the case of adopting one index, it is preferable to improve the ranking provided by the private survey institution and to decrease the occurrence rate of the accident. It is more preferable to take the well-balanced combination of the plurality of indices than being limited to one index. In this case, it is preferable to use the index related directly to the product and the service and the index related to improving the satisfaction and obviating the dissatisfaction of the related parties affected by the enterprise. A combination of these indices can be exemplified by combining the indices for improving the occupancy ratio of the new commercial product to the whole, improving the ranking provided by the private survey institution and decreasing the occurrence rate of the accident. These indices involve setting a scheme for setting target values to be respectively attained and a scheme for attaining the target values, separately.

A more specific example is that the following conditions are set in an item C-2 of the comfort index.

1. Degree of satisfaction of stockholder:

A ratio of the stock price of the evaluation target company to an average stock price is increased (20% against the reference period (e.g., September in 2010).

2. Degree of satisfaction of related parties:

As for the ranking given by the survey company, the evaluation target company is improved by 20 ranks.

3. Degree of satisfaction of employee:

A male-to-female ratio of the management posts is made approximate to 1:1.

A rate of employees of foreign nationalities is set equal to or larger than a predetermined value.

Overtime is set smaller than the predetermined value.

The points are calculated corresponding to a rate that meets these conditions.

FIG. 3 illustrates how the points of the sustainability index, the health index and the comfort index, which build up the MOS index, are allocated. In FIG. 3, the target values of the sustainability index, the health index and the comfort index are set to 3.4 points, 3.3 points and 3.3 points, respectively. Further, 1.2 points, 1.1 points and 1.1 points are allocated to respective items of the sustainability index. Each of the items of the health index and the comfort index receives the allocation of 1.1 points. Namely, the MOS index is evaluated on the maximum basis of 10 points.

§2. The MBA index contains at least one of (1) an operating profit attainment rate, (2) a ROA (Return On Asset) attainment rate, (3) a D/E (Debt/Equity) ratio attainment rate, (4) a progress of transformation, (5) a profitability per stock and (6) a total market value. Among these elements, it is preferable the MBA index contains at least one of the items (1)-(3), (5) and (6) as a subdivided index. The MBA index can be obtained by, e.g., an adding process in which the subdivided indices (1)-(6) are weight-added based on respective weights (which will hereinafter be referred to as an allocation rate).

For instance, a petrochemical sector occupying about a half of proceeds is largely affected by market prices of crude oils and exchanges, and hence such an evaluation may be done that the influence of the "MBA index" on the proceeds is almost "zero". As in pharmaceutical, the proceeds are linked directly to a business scale and profits as the case may be, so that the selection of subdivided indices added for the MBA index and the allocation rate should be examined to become those appropriate to the individual businesses and enterprises.

The following an example of the allocation rates of the respective subdivided indices.

(1) Operating profit attainment rate: 30%
(2) Attainment rate of ROA: 20%
(3) Attainment rate of a D/E ratio: 15%
(4) Progress of transformation+15%
(5) Profitability per stock: 10%
(6) Total market value: 10%.

FIG. 4 is a diagram illustrating the allocation of the points of the subdivided indices (1)-(6) building up the MBA index, which are obtained according to the allocation rates described above. In the case of obtaining the values of the subdivided indices (1)-(6) on the maximum basis of 10 points, the allocation rates are 30%, 20%, 15%, 15%, 10% and 10%, and hence the points allocated to these subdivided indices (1)-(6) are 3 points, 2 points, 1.5 points, 1.5 points, 1 point and 1 point. The MBA index is a value obtaining by adding 3 points, 2 points, 1.5 points, 1.5 points, 1 point and 1 point allocated to the subdivided indices (1)-(6).

Note that in the MBA index, the progress of transformation is a degree of how much the transformation taken into a management scheme and estimated expenses is attained with respect to reorganization of the business such as M & A (Mergers and Acquisitions), a withdrawal or downsizing and a business transfer between business corporates. For instance, a predetermined evaluator may determine the points of the transformation by evaluating the attainment rate for every scenario. Simply, the evaluation may be made at a ratio of the number of completed business transfers to the number of schemes. Note that the business transfer between the business corporates implies transferring the business, in the case of Holdings (a holding company) which holds a plurality of corporates such as A Corp., B Corp., C Corp. and D Corp., among these four corporates.

Further, it is assumed in the embodiment that the transformation includes at least one of the M & A, the reorganization of the business and the business transfer between the business corporates.

§3. MOT (Management of Technology) is defined as a management technique that is widely advocated in the management of technology. Further, the MOT is also said to be management for creating economic values in the future in a way that stands in the field of long-term view by ascertaining a possibility of a sustainable development brought about by a certain technical innovation of the enterprise/organization and connecting the specified technical innovation to the business as a result of the ascertainment.

Herein, the technical innovation embraces technologies of solving problems with a high degree of difficulty and/or problems that are strongly socially requested to be solved, and can be grasped as the innovation of a scientific technology. The innovation of the scientific technology, however, embraces technological improvements and even failures that will produce values used for successes in the future. Further, the technical innovation can be grasped not only as the innovation of the scientific technology in a narrow sense but also as the technical innovation in a broad sense that includes an innovation of a marketing technology, an innovation of a technology of a business management, a technological innovation of a commodity distribution technology, a technological innovation related to a method of procurement of funds, a technological innovation that accompanies realization of a strategy for intellectual property, a technological innovation that accompanies configuring a business model and a technological innovation that accompanies a proposal and realization of enterprise affiliation.

The MOT index defined as an index related to the MOT is calculated based on a predetermined value pertaining to the technological innovation. The MOT index in the embodiment includes at least one of the following items (1)-(3) as the predetermined value related to the technological innovation. Further, in terms of standing in a viewpoint such as "creation of innovation", the marketing technology and the development/improvement of the technology of the business management may also be taken into the MOT index.

For example, the MOT index is assumed to be calculated by totalizing the following subdivided indices (1)-(3), and the allocation rates thereof are given as follows:

(1) Resource investment rate into management of technology: 30%
(2) Period target attainment rate of activity related to management of technology: 30%
(3) Rate of outcome from activity related to management of technology: 40%

FIG. 5 is a diagram illustrating how points of respective subdivided indices (1)-(3), which build up the MOT index, are allocated. In the case of obtaining the values of the subdivided indices (1)-(3) on the maximum basis of 10 points, the allocation rates are 30%, 30%, and 40%, and hence the points allocated to these subdivided indices (1)-(3) are 3 points, 3 points 4 points. The MOT index in the embodiment is a value obtaining by adding 3 points, 3 points 4 points allocated to the subdivided indices (1)-(3).

(1) Resource investment rate into management of technology contains at least of one of the following rates (I)-(III), and a specific example is a value obtained by totalizing the attainment rates (I)-(III). This resource investment rate into management of technology is evaluated based on a degree of progress as to whether or not funds and human resources are invested as the scheme prescribes and whether or not a human resource educating activity is carried out as the scheme prescribes. For instance, the following are the maximum points, the total points are given on the maximum basis of 10 points, and, as for the resource investment rate into the activity related to the management of technology, the MOT value can be acquired on the maximum basis of 30%.

(I) Personnel investment rate into the activity related to the management of technology: 3.5 points
(II) Fund investment rate into the activity related to the management of technology: 3.5 points
(III) Human resource education scheme: 3.0 points (2) The period target attainment rate of activity related to the management of technology serves to see whether the target set per period is attained or not and, in other words, serves to evaluate the degree of progress and/or speed. For example, a target of "finishing a basic condition search of a reaction system and entering a design of a pilot plant" is set, and, if this target is implemented as the scheme prescribes, 10 points are given at the maximum. With this scheme, the maximum rate of 30% can be acquired as the MOT value with respect to the period target attainment rate of the activity related to the management of technology. Even if the target is not completely attained and when a predetermined progress for the target is seen, the evaluation is made pursuant to a preset target attainment degree. Alternatively, even when the predetermined progress for the target is not seen and if there is obtained a result of contributing to the technological innovation to enhance establishment of a success in the future such as being able to propose a change of the directivity of the basic condition search, the evaluation is made pursuant to the preset target attainment degree.

(3) The rate of outcome from the activity related to the management of technology serves to evaluate the outcome yielded from the activity related to the management of technology. The rate of outcome from the activity related to the management of technology contains at least one of the following outcomes (I)-(VII), and a specific example is a totalized value (10 points at the maximum) of the following outcomes. As for the rate of outcome from the activity related to the management of technology, the MOT value can be acquired on the maximum basis of 40%.

(I) Case of industrializing a new technology and commercializing a new product: 2 points
(II) Outcome of intellectual property such as a patent: 2 points
(Herein, the outcome of the intellectual property is exemplified by the number of patent applications for a predetermined period, the number of patents registered for the predetermined period, the number of patent applications having influence on other companies that filed for the predetermined period, and the number of registered applications having the influence on other companies that registered for the predetermined period, etc.)
(III) Case of becoming candidate for award: 1 point (Herein, the candidate for an award includes candidates for out- and in-company awards (CEO award, RD award, IP award, etc)
(IV) Acquisition of new know-how: 1 point
(Expansion of potential power of technology)
(V) Progress of evaluation by potential customer: 1 point
(VI) Attainment of affiliation of enterprise based on activity of intellectual property: 1 point
(VII) Attainment of large improvement of efficiency of operation (including sales etc): 2 points Note that the MOT index can contain a short-term target of approximately, e.g., one year, an intermediate-term target of about, e.g., 5 years and a long-term target of, e.g., 10 years or longer depending on the degree of difficulty for attainment as in the case where the MOT is directed to the development of technology such as the research and development. In this case, when the degrees of attainment of the long- and short-term targets are evaluated on the same dimension, the appropriate evaluation could become hard to be done relatively depending on acceleration and deceleration of an attainment speed. Even in this case also, the respective targets at the point of time when still in progress are rebuilt based on the intermediate- and long-term target and replaced with evaluations based on the degrees of attainment of the targets at respective points of time (replaced with the present values), thereby enabling the relative evaluations to be properly made.

The same is applied to the MOS index (for instance, with respect to the intermediate- and long-term target such as a reduction target of $CO_2$, and the long-term target such as a development of medicine for improving a cure rate of the serious disease also, the targets at the point of time when still in progress are rebuilt, and the degrees of attainment of the targets are evaluated).

Note that the subdivided indices and the respective allocation rates of these subdivided indices of the MBA index, the MOT index and the MOS index are not universal but can be properly changed. For example, the subdivided indices are reviewed in a way that increases the points of the subdivided indices of which importance rises depending on, e.g., transitions of times and environments and decreases the points of the subdivided indices of which the importance lowers. Further, the subdivided indices themselves may also be changed into other subdivided indices as the necessity may arise.

The outcome elements of the MBA index, the MOT index and the MOS index have a possibility of being equal to or larger than the maximum point. The maximum point is gained when attaining the presumed target, and the maximum or higher point is gained when the outcome becomes equal to or higher than the presumed level. If the MBA index, the MOT index and the MOS index reach being equal to or higher than the maximum points, the performance vector of the enterprise value could exceed the target vector.

If attaining a tremendous innovation, the evaluation could gain 5 points on the maximum basis of 1 point, at which time the vector is biased to the MOT axis. At this time, the directivity of the vector diverges from an originally intended well-balanced directivity, however, in that case, the length also becomes several times as large as the original, and it therefore follows that "there is absolutely no problem in terms of the management".

Further, it follows that "the evaluation is conducted while observing both of the direction and the length", and, whatever performances on other axes in the three-dimensional management may be, the target setting and the performance evaluation on the axis concerned are to appear in vector in some "form" at all times.

On the other hand, as hitherto be done, if the outcomes of the MOS and the MOT are converted into monetary values and thus evaluated, it follows that situations of how things about the MOS and the MOT are when gaining huge profits become hazy and hard to exhibit.

<Four-Dimensional Evaluation Method>

Figure 6:
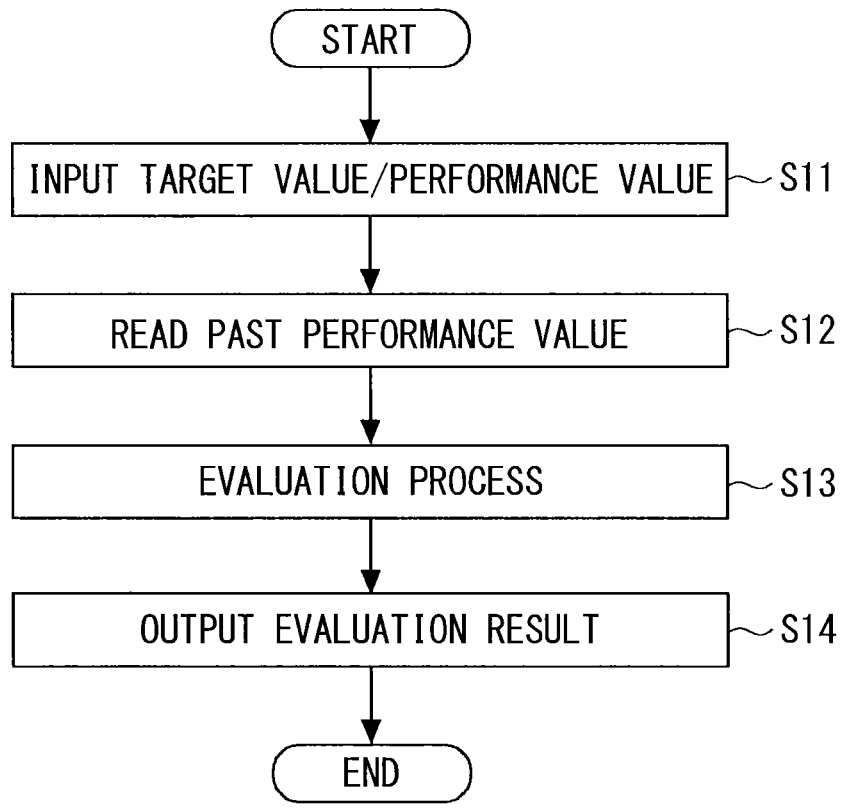
FIG. 6 is an explanatory flowchart of an evaluation method executed by an evaluation device in a first embodiment in accordance with an evaluation program.

FIG. 6 is an explanatory flowchart of an evaluation method executed by the computer-based evaluation device 1 in accordance with an evaluation program.

In the evaluation device 1, upon receiving a boot command through a user's operation, the arithmetic processing unit 12 reads the evaluation program form the storage unit 13 and executes this evaluation program, thereby starting processes in FIG. 6.

To begin with, the target accepting unit 121 accepts inputting the target value of the MBA index, the target value of the MOT index and the target value of the MOS index, and stores these values in the storage unit 13 or the memory. Further, the performance accepting unit 122 accepts inputting the performance value of the MBA index, the performance value of the MOT index and the performance value of the MOS index, and stores these values in the storage unit 13 or the memory (step S11).

Moreover, the evaluation unit 123 reads the performance values of the MBA index, the performance values of the MOT index and the performances value of the MOS index with respect to a plurality of past evaluation periods from the storage unit 13 (step S12). Note that the plural past evaluation periods are predetermined units of evaluation periods such as one month, a quarter of the year, a half-term and a fiscal year.

Next, the evaluation unit 123 obtains the target vector of the enterprise value and the performance vector of the enterprise value on the basis of the target value of the MBA index, the target value of the MOT index and the target value of the MOS index, and the performance value of the MBA index, the performance value of the MOT index and the performance value of the MOS index, which are inputted in step S11. Further, the evaluation unit 123 obtains the performance vector of the enterprise value on the basis of the performance value of the MBA index, the performance value of the MOT index and the performance value of the MOS index for the plurality of past evaluation periods. Then, the evaluation unit 123 evaluates the enterprise value on the basis of the directions, the lengths and timewise changes of the target vector and the performance vector (step S13).

Figure 7:
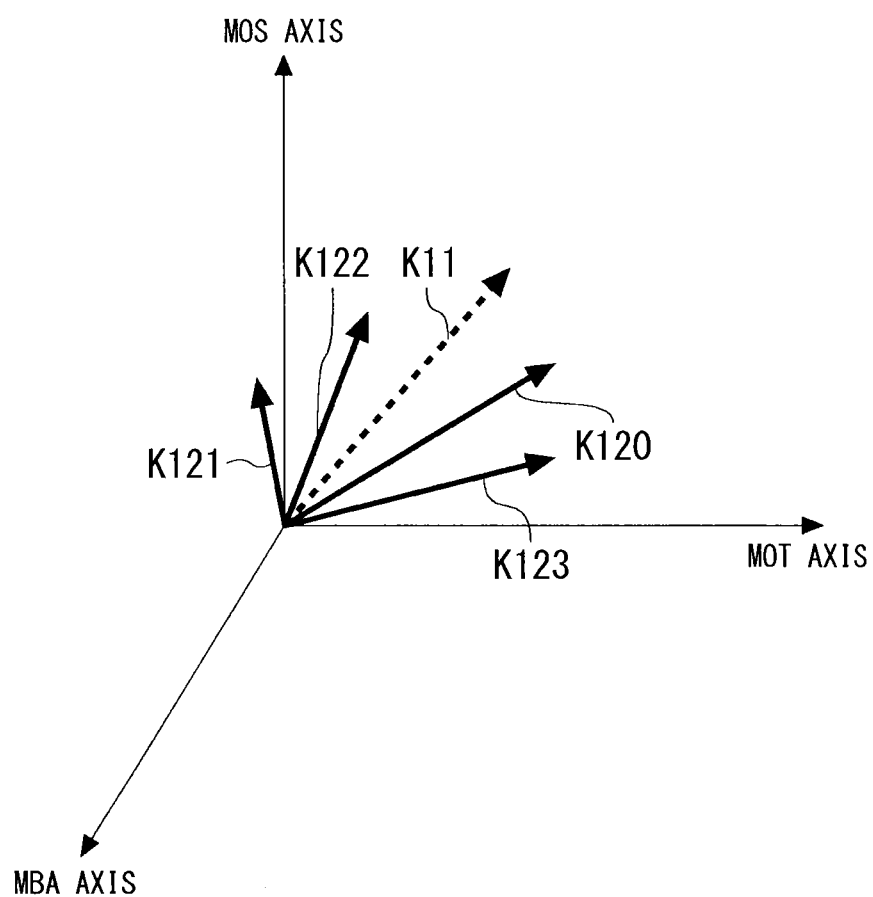
FIG. 7 is a diagram illustrating transitions of performance vectors on a year-by-year basis.

Then, the output control unit 124 renders the target vector of the enterprise value and the performance vectors for the plurality of past periods on the same three-dimensional coordinates (step S14). FIG. 7 is a diagram illustrating transitions of the performance vectors on the year-by-year basis.

In FIG. 7, an arrow K11 represents the target vector of the enterprise value of the current fiscal year, and an arrow K120 represents the performance vector of the enterprise value of the current fiscal year. Further, an arrow K123 represents the performance vector of the enterprise value of the previous fiscal year, an arrow K122 represents the performance vector of the enterprise value of the past fiscal year that is two years ago, and an arrow K121 represents the performance vector of the enterprise value of the past fiscal year that is three years ago.

Thus, according to the first embodiment, it is feasible to express the transitions of the performance vectors on the year-by-year basis and to easily confirm the directivity (the direction of the performance vector) of the enterprise activity and a volume of the performance (a length of the performance vector).

Further, the transitions of the performance vectors can be also displayed as a line graph formed by connecting the apexes of the performance vectors.

Figure 8:
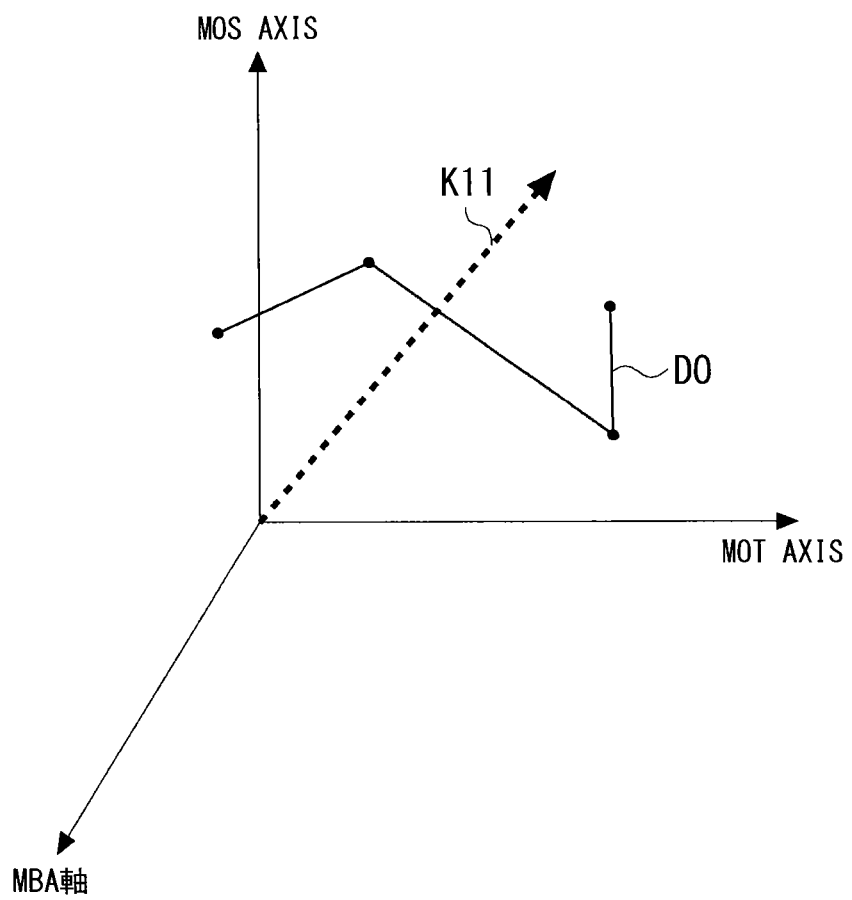
FIG. 8 is a diagram illustrating a line graph formed by connecting apexes of the performance vectors depicted in FIG. 7.

FIG. 8 is a diagram illustrating a line graph D0 formed by connecting the apexes of the performance vectors depicted in FIG. 7. In FIG. 8, the arrows 120-123 indicating the performance vectors are not displayed, however, the arrows 120-123 indicating the performance vectors may be displayed together with the line graph D0.

Figure 9:
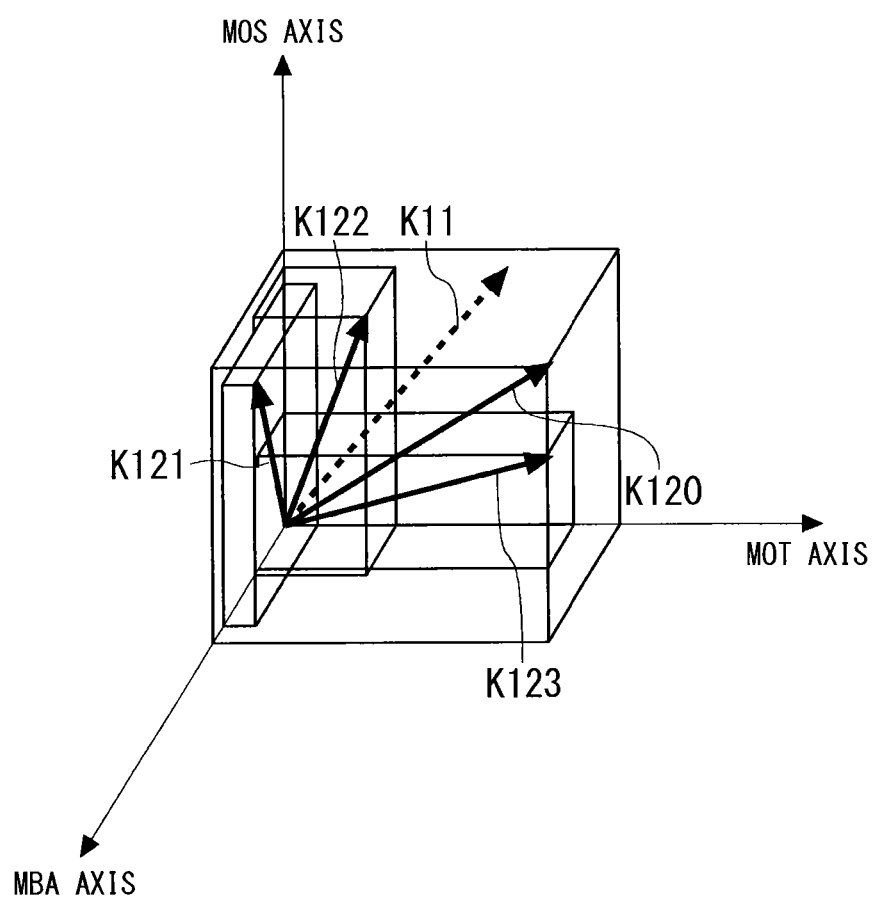
FIG. 9 is a diagram illustrating transitions of a volume of a performance space by rendering rectangular parallelepipeds in which the performance vectors depicted in FIG. 7 serve as diagonal lines.

FIG. 9 is a diagram illustrating transitions of a volume of a performance space by rendering rectangular parallelepipeds in which the performance vectors depicted in FIG. 7 serve as diagonal lines. Quantitative changes of the performance obtained by totalizing the MBA index, the MOT index and the MOS index can be intuitively confirmed.

As in FIG. 9, in the case of displaying the evaluation results (performance volumes) for a plurality of periods, the performance volumes may be displayed by changing the colors on a per evaluation period basis.

Figures 29, 30:
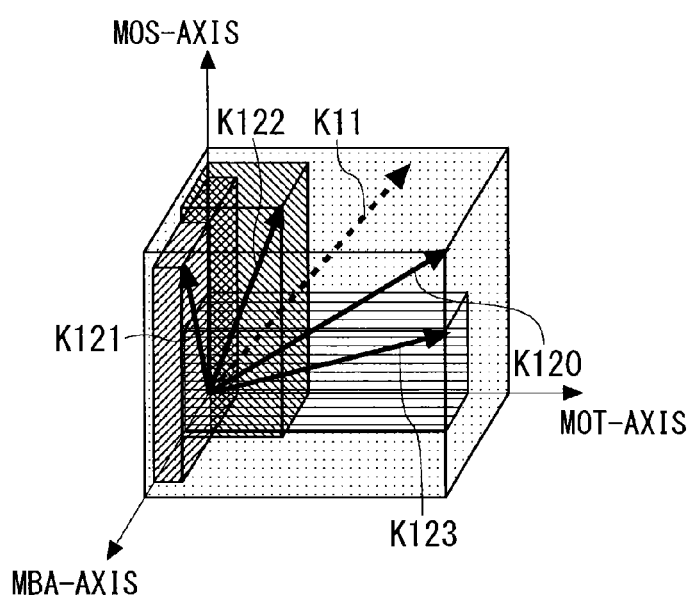
FIG. 29 is a diagram illustrating one example of a color designation table.
FIG. 30 is a view depicting an example of the rectangular parallelepiped of each fiscal year, which is expressed in colors designated by the color designation table.

For example, a color designation table is created beforehand, in which the plurality of evaluation is associated with the colors such as red, blue and green indicating the respective evaluation periods on the per fiscal year basis, and this color designation table is stored on the storage unit 13. Namely, the storage unit 13 is configured as a color designation table storage unit. FIG. 29 is a diagram illustrating one example of the color designation table. In the color designation table depicted in FIG. 29, the colors are designated such that red is associated with an Nth fiscal year, blue is associated with an (N-1)th fiscal year, green is associated with an (N-2)th fiscal year and yellow is associated with an (N-3)th fiscal year.

Then, on the occasion of rendering the rectangular parallelepipeds of the performance values as evaluation results as described above, the output control unit 124 reads the colors on the per evaluation period basis from the color designation table, then generates the image information representing the respective rectangular parallelepipeds in colors on the per evaluation period basis and displays the generated image information on the display device. FIG. 30 illustrates an example of displaying the rectangular parallelepipeds of the respective fiscal years in colors designated by the color designation table. Note that color differences are indicated by types of hatchings for the sake of convenience in FIG. 30.

Further, the output control unit 124 may sequentially display the rectangular parallelepipeds of the performance values for the respective evaluation periods corresponding to the elapse of time. For example, if there are the performance values for the plurality of evaluation periods such as the first fiscal year, the second fiscal year, the third fiscal year . . . , pieces of image information representing the respective rectangular parallelepipeds are sequentially output and displayed at display timings at intervals of a predetermined period of time (e.g., several seconds) corresponding to the time lapse of the timing when the performance is gained in the present example. Namely, the rectangular parallelepipeds of the performances are displayed in the sequence such as the (N-3)th fiscal year, the (N-2)th fiscal year, the (N-1)th fiscal year and the Nth fiscal year. It is thereby feasible to display the easy-to-grasp time transitions of the performance values.

Figure 31A:
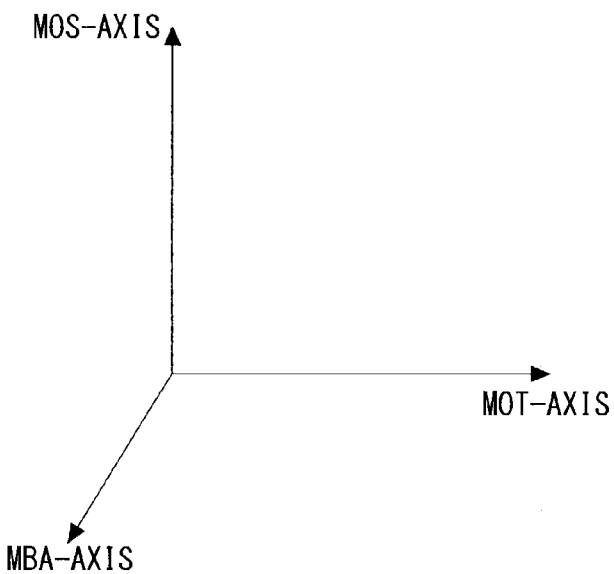
FIG. 31A-31C are a view illustrating examples of sequentially displaying the rectangular parallelepipeds of the respective fiscal years depicted in FIG. 30.
Figure 31B:
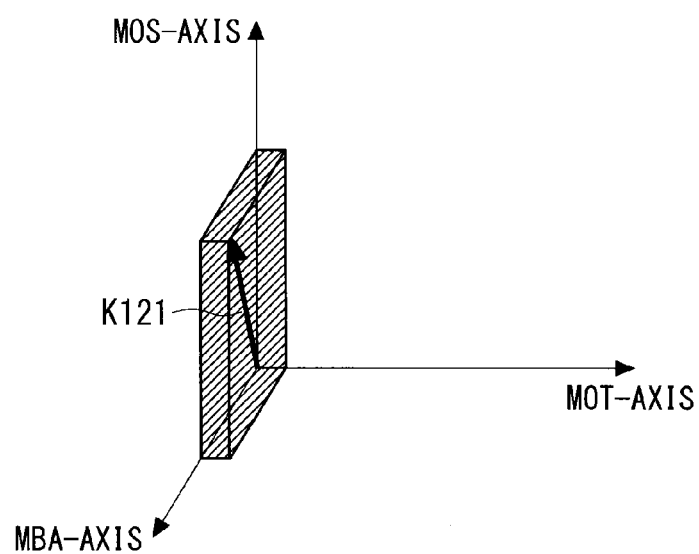
Figure 31C:
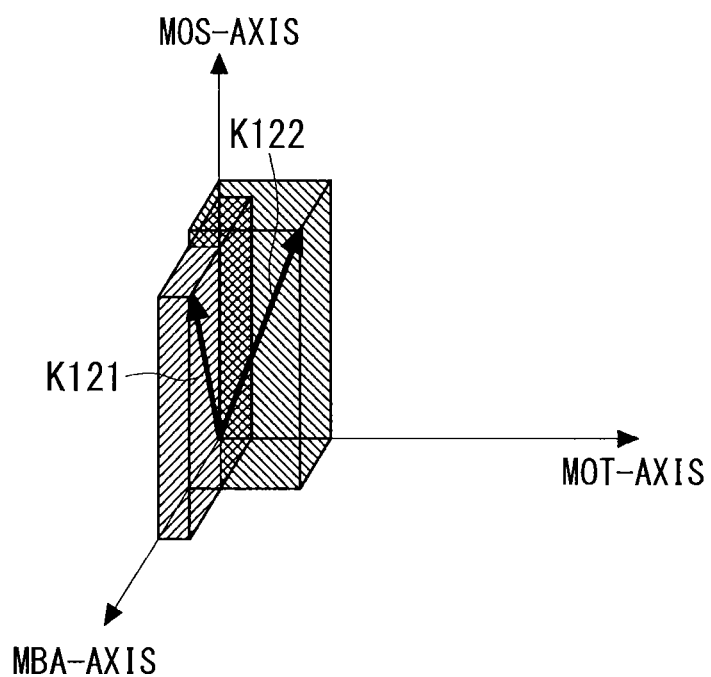
Figure 32A:
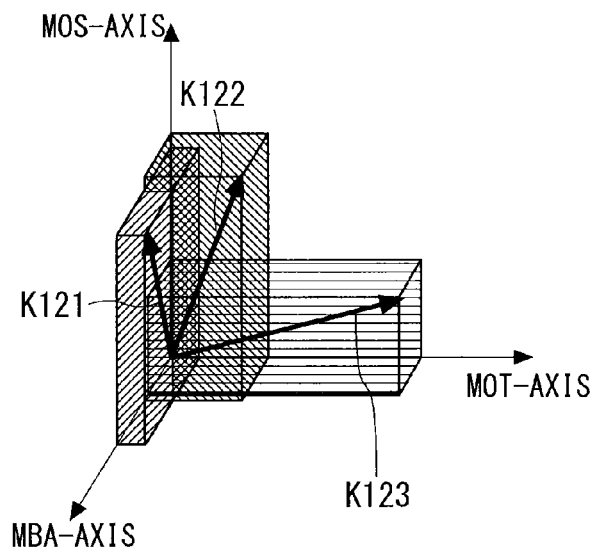
FIG. 32A, 32B are a view illustrating examples of sequentially displaying the rectangular parallelepipeds of the respective fiscal years depicted in FIG. 30.
Figure 32B:
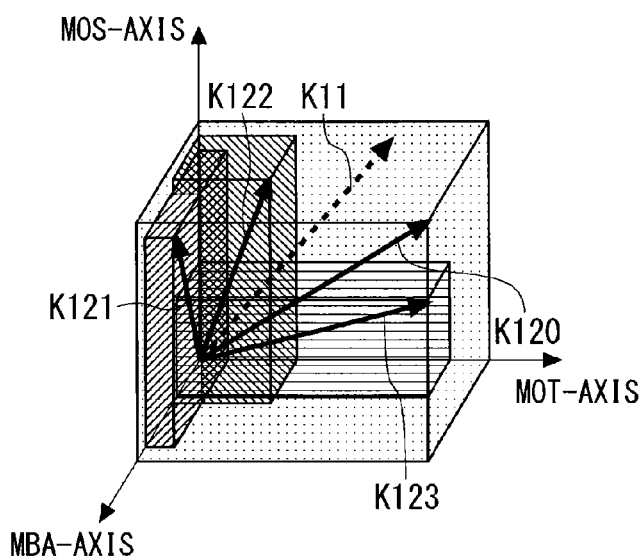

FIGS. 31A-31C, 32A and 32B illustrate how the rectangular parallelepipeds of the respective fiscal years depicted in FIG. 30 are displayed sequentially. FIG. 31A is a diagram illustrating only the three-dimensional coordinates before displaying the rectangular parallelepiped, FIG. 31B is a diagram illustrating an example of the rectangular parallelepiped of the (N-3)th fiscal year after 2 sec from a state of FIG. 31A, FIG. 31C is a diagram illustrating an example of the rectangular parallelepiped of the (N-2)th fiscal year after 2 sec from a state of FIG. 31B, FIG. 32A is a diagram illustrating an example of the rectangular parallelepiped of the (N-1)th fiscal year after 2 sec from a state of FIG. 31C, and FIG. 32B is a diagram illustrating an example of the rectangular parallelepiped of the Nth fiscal year after 2 sec from a state of FIG. 32A. As depicted in FIGS. 31A-32B, when the rectangular parallelepipeds of the performances are displayed in sequence on the per fiscal year basis, the entrepreneur recognizes how the performance value of each fiscal year increases or decreases against the preceding fiscal year, and can easily grasp the increase/decrease in performance value and the transitions of balance thereof. Note that the display interval of the rectangular parallelepiped representing the performance of each fiscal year is set to 2 sec, in which case there may be available the display intervals proportional to a length of the period for which to gain the performance such that the display interval of the rectangular parallelepiped representing the performance for every interim term (half a year) is set to 1 sec, and the display interval of the rectangular parallelepiped representing the performance for every quarter of the fiscal year is set to 0.5 sec.

Herein, the evaluation unit 123 may evaluate the length of the performance vector with respect to the target vector. For example, the evaluation unit 123 sets a threshold value of the performance vector at 50% and, if the length of the performance vector against the target vector becomes less than 50%, issues an alarm due to a divergence from the threshold value. Note that the threshold value may arbitrarily be set corresponding to a level at which to require the alarm and may be set at, e.g., 60% and 70% or 40%.

Further, the evaluation unit 123 may evaluate an angle made by the target vector and the performance vector with the origin serving as the apex, i.e., a directional divergence of the performance vector. For instance, the evaluation unit 123 sets the threshold value of the directional divergence at 45° and, if the angle made by the target vector and the performance vector becomes larger than 45°, issues the alarm. Note that the threshold value may arbitrarily be set corresponding to a level at which to require the alarm and may be set at, e.g., 30° and 20°.

Moreover, the resource allocation setting unit 127 sets one evaluation period in the plurality of evaluation periods as a first evaluation period, and sets the evaluation period next to the first evaluation period as a second evaluation period. Then, the resource allocation setting unit 127 may, if a distance between the tip of the performance vector and the tip of the target vector of the enterprise value in the first evaluation period diverges to the degree equal to or larger than the predetermined value, set again the resource allocation in the second evaluation period based on this divergence. For example, the resource allocation setting unit 127, with respect to the index exhibiting the maximum divergence between the performance value and the target value among the MBA index, the MOT index and the MOS index in the first evaluation period, increases a resource value preset for attaining the target at a predetermined rate. Moreover, the resource allocation setting unit 127 sets again the resource allocation by reducing the increased value from the preset resource value with respect to the index exhibiting the minimum divergence. Alternatively, the resource allocation setting unit 127 sets again the resource allocation by reducing the increased value from the preset resource value with respect to the index exhibiting the minimum divergence and from the preset resource value with respect to the index other than the index exhibiting the maximum divergence and the index exhibiting the minimum divergence.

Figure 38:
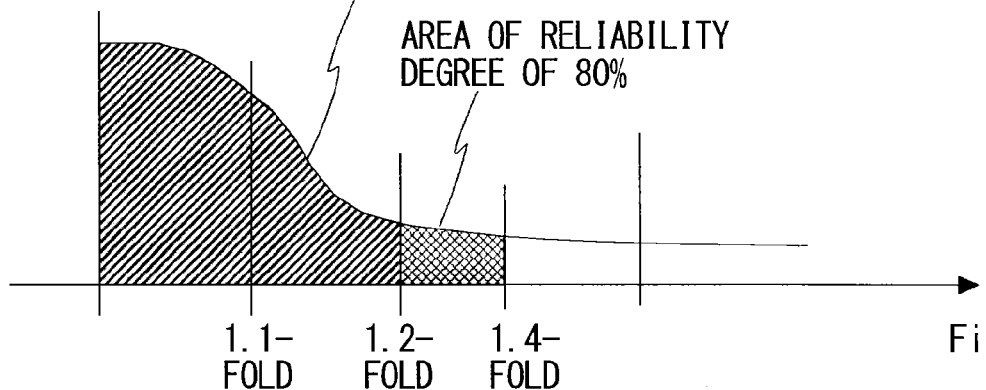
FIG. 38 is an explanatory diagram of a probability density profile.

The resource allocation setting unit 127 sets, e.g., a first quarter as the first evaluation period and a second quarter as the second evaluation period. Then, the resource allocation setting unit 127, if the distance between the tip of the performance vector and the tip of the target vector of the enterprise value in the first quarter diverges to the degree equal to or larger than the predetermined value, changes the resource allocation in the second quarter. This change in resource allocation involves increasing the preset resource value at the predetermined rate with respect to the index exhibiting the maximum divergence among the divergence between the performance value and the target value in the MBA index, the divergence between the performance value and the target value in the MOT index and the divergence between the performance value and the target value in the MOS index. For example, the resource allocation setting unit 127, if increased at 20% with respect to the index exhibiting the maximum divergence and if an estimated cost is 1 billion yen, obtains 1.2 billion yen by calculation. Herein, the ratio at which to increase the resources may be set to a increment ratio corresponding to a degree of reliability. For example, the degree of reliability requested by the user (entrepreneur) is previously set, and the resource allocation setting unit 127 increases a value of the preset resource with respect to the index exhibiting the largest divergence at an increment ratio Fi corresponding to the degree of reliability. The increment ratio Fi can be obtained from the probability density function as illustrated in FIG. 38. In FIG. 38, the increment ratio Fi is taken along the axis of abscissas, and a value obtained by integrating an area of the graph indicates the reliability degree (P). That is, the probability of a 1.0-fold increment ratio is lowest, and the reliability degree rises as the increment ratio increases. In the example of FIG. 38, a 1.2-fold increment ratio Fi is given at a reliability degree 68%, and a 1.4-fold increment ratio Fi is given at a reliability degree 80%.

The increment ratio Fi when this reliability degree (P) is given can be defined as follows:

$$\int_0^x f(x) = \text{Reliability degree}(P)$$

Note that if f(x) is given by an empirical formula, the integral calculation may be performed according to $\Sigma f(xi)$ Δxi. Further, if the profile data are stored in a histogram-formatted table, the same calculation may be done, in which Δxi represents a width of the axis of abscissas of the histogram, and f(xi) indicates a sample count.

Note that the resource to be increased may be, without being limited to a fund, persons (personnel) and goods (assets). Furthermore, a combination of these elements is also available. The increasing rate may be arbitrarily set, and, for instance, a 5% increase or a 20% increase may be adopted. Note that a rate of the resource, which is increased for compensating a divergence between the plural periods, is set preferably larger than in the case of the single period demonstrated in the first embodiment. For instance, it is desirable that the increasing rate in the case of the plural fiscal years is set twice or three times as large as the increasing rate in the single fiscal year.

Further, the output control unit 124 may perform backcalculations of a value related to the business achievements in the case of conducting the enterprise activities for the next evaluation period on the basis of the reset resources, a value related to the management of technology and a value related to the sustainability, transmit these values to the financial system, the management system of the factory etc and the personnel affairs system, and set these values as threshold values of the respective systems.

Figure 33:
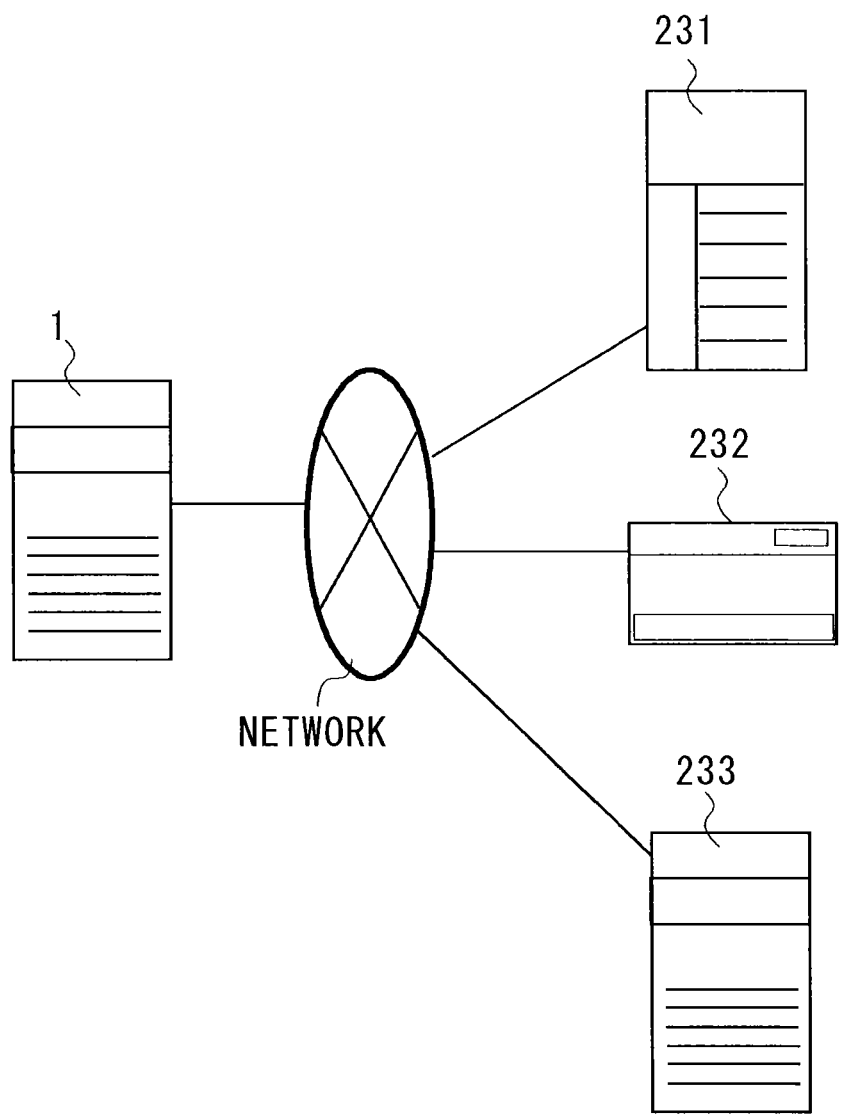
FIG. 33 is a diagram illustrating an example of how threshold values are set in a financial system, a management system of a factory etc and a personnel affairs system.

FIG. 33 is a diagram illustrating an example of how the financial system, the management system of the factory etc and the personnel affairs system are made to set the threshold values. In FIG. 33, the numeral 231 denotes the financial system of the enterprise, 232 stands for the management system of the factory etc, and 233 represents the personnel affairs system of the enterprise, in which each system is a computer equipped with a processor, a memory etc.

The output control unit 124 of the evaluation device 1 calculates discharge quantities of the greenhouse effect gas, NOx, Sox, soot/dusts and PRTR investigation target substances in the case of conducting the enterprise activities for the next evaluation period on the basis of the reset resources, and the calculated discharge quantities to the management system 232 of the factory etc and gets the system 232 to set these quantities as threshold values. The management system 232 stores the received threshold values on the storage unit such as the memory. Then, the management system 232 monitors the greenhouse effect gas, NOx, etc discharged when operated at the factory etc, and displays an alarm when exceeding the threshold values.

Moreover, the output control unit 124 calculates a male-to-female ratio of the management posts, a rate of employees having foreign nationalities and overtime in the case of conducting the enterprise activities for the next evaluation period on the basis of the reset resources, transmits the calculated values to the personnel affairs system 233, and gets the personnel affairs system 233 to set these values as the threshold values. The personnel affairs system 233 stores the received threshold values on the storage unit such as the memory. Then, the personnel affairs system 233 monitors the male-to-female ratio of the management posts, the rate of the employees having the foreign nationalities and the overtime, and displays the alarm when exceeding the threshold values.

Furthermore, the output control unit 124 calculates an operating profit attainment rate, an ROA (Return On Asset) attainment rate, a D/E (Debt/Equity) ratio attainment rate, a progress of transformation, a profitability per stock and a total market value as the values related to the business achievements in the case of conducting the enterprise activities of the next evaluation period on the basis of the reset resources, transmits these values to the financial system 231, and gets the financial system 231 to set these values the threshold values. The financial system 231 stores the received threshold values on the storage unit such as the memory. Then, the financial system 231 monitors the values related to the business achievements accompanying the enterprise activities, and displays the alarm when exceeding the threshold values.

Thus, the evaluation device 1 according to the first embodiment, which makes the four-dimensional evaluation of the business achievement of the enterprise, changes, if the balance gets collapsed with the lapse of time, the resource allocation to compensate this collapsed-balance, then presents the changed resource allocation, and is thereby capable of supporting the healthy management of the enterprise by causing neither any large deflection nor the collapse of the balance.

The present evaluation device 1 may adopt a stereoscopic display device which displays stereoscopically the evaluation results as the display device. The stereoscopic display device enables the stereoscopic view to be provided by displaying the image for the right eye and the image for the left eye with the parallax in separation temporally or spatially.

FIG. 34 is an explanatory diagram of the stereoscopic display device that displays the image for the right eye and the image for the left eye in separation temporally. The stereoscopic display device depicted in FIG. 34 includes display elements 17 for displaying the image for the right eye and the image for the left eye, and a spectacle 16 worn by the user.

The display elements 17 display the image for the right eye and the image for the left eye received from the output control unit 124 alternately at a predetermined cycle. The spectacle 16 intercepts a light flux entering the right eye of the user or the light flux entering the left eye of the user alternately in a way that synchronizes with the display cycle of the image for the right eye and the image for the left eye, which are displayed by the display elements 17.

Figure 34A:
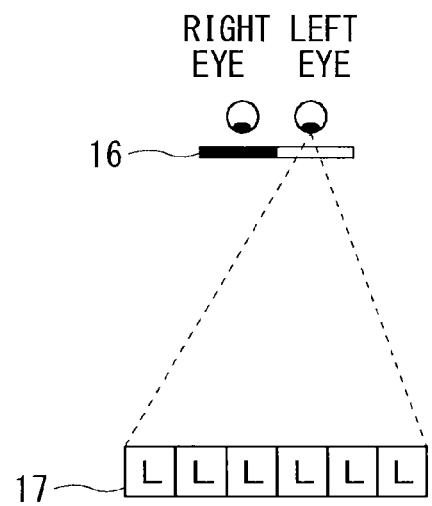
FIG. 34A, 34B are explanatory diagrams of a stereoscopic display device which displays an image for a right eye and an image for a left eye separately and alternately.
Figure 34B:
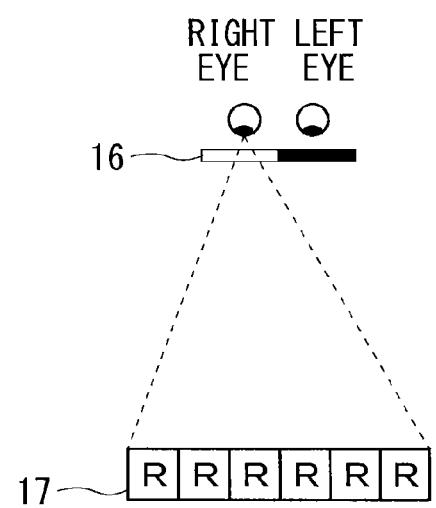

FIG. 34A is a diagram illustrating an example of displaying the image for the left eye. In FIG. 34B (34A), the image for the left eye is displayed on the display elements 17, and the spectacle 16 intercepts the light flux entering the right eye but transmits the light flux entering the left eye. Further, FIG. 34B is a diagram illustrating an example of displaying the image for the right eye. In FIG. 34B, the image for the right eye is displayed on the display elements 17, and the spectacle 16 intercepts the light flux entering the left eye but transmits the light flux entering the right eye. Thus, the stereoscopic display device in FIG. 34 displays the image for the right eye and the image for the left eye in separation temporally, thereby enabling the user to visually recognize the image for the right eye and the image for the left eye with the right eye and the left eye respectively and to view the image stereoscopically.

Figure 35A:
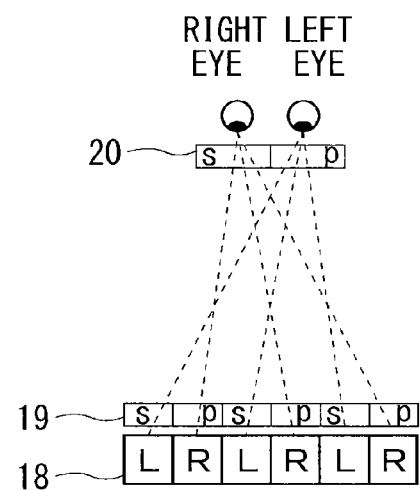
FIG. 35A, 35B are explanatory diagrams of the stereoscopic display device which displays the image for the right eye and the image for the left eye separately and in spatial arrangement.

Moreover, FIG. 35 is an explanatory diagram of the stereoscopic display device that displays the image for the right eye and the image for the left eye in separation spatially. The stereoscopic display device depicted in FIG. 35A includes display elements 18 for displaying the image for the right eye and the image for the left eye, a polarizing filter 19 and a spectacle 20 worn by the user.

The display elements 18 display the image for the right eye and the image for the left eye received from the output control unit 124 alternately on a pixel-by-pixel basis. Further, the pixels for displaying the image for the right eye and the pixels for displaying the image for the left eye are provided with the polarizing filters having polarizing surfaces different from each other. For instance, the display elements 18 in FIG. 35A include a polarizing filter "S" that transmits the light flux of S-polarized light on the pixels for displaying the image for the right eye, and include a polarizing filter "P" that transmits the light flux of P-polarized light on the pixels for displaying the image for the left eye. Hence, the light flux of the S-polarized light in the image for the right eye that is displayed on the display elements 18 penetrates the polarizing filter "S", and the light flux of the P-polarized light in the image for the left eye that is displayed on the display elements 18 penetrates the polarizing filter "P".

The spectacle 20 includes the polarizing filter "S" that transmits the S-polarized light at the portion for the right eye and the polarizing filter "P" that transmits the light flux of the P-polarized light at the portion for the left eye.

The stereoscopic display device illustrated in FIG. 35A displays the image for the right eye and the image for the left eye on the display elements 18 alternately in separation spatially, and the polarizing filter 19 differentiates the directions of the polarizing surfaces depending on the image for the right eye and the image for the left eye. Then, the right eye portion of the spectacle 20 transmits the light flux, as the S-polarized light, of the image for the right eye, and the left eye portion of the spectacle 20 transmits the light flux, as the P-polarized light, of the image for the left eye, thereby enabling the user to visually recognize the image for the right eye and the image for the left eye with the right eye and the left eye respectively and to view the image stereoscopically.

Figure 35B:
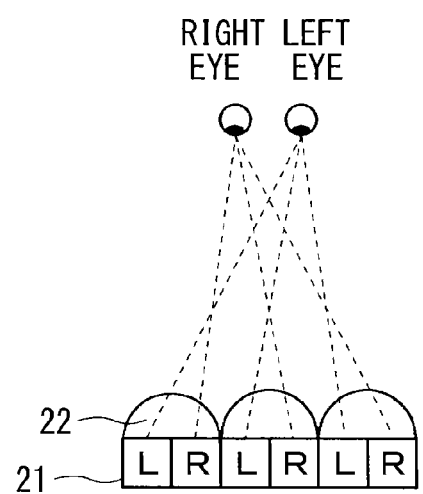

The stereoscopic display device illustrated in FIG. 35B includes display elements 21 for displaying the image for the right eye and the image for the left eye, and a cylindrical lens 22.

The display elements 21 display the image for the right eye and the image for the left eye received from the output control unit 124 alternately on the pixel-by-pixel basis. Further, the cylindrical lenses 22 are provided on the pixels for displaying the image for the right eye and the pixels for displaying the image for the left eye. For example, the cylindrical lenses 22 in FIG. 35B guide the light flux from the pixels for displaying the image for the right eye to the right eye and the light flux from the pixels for displaying the image for the left eye to the left eye owing to lens effect of the cylindrical surfaces. The user is thereby enabled to visually recognize the image for the right eye and the image for the left eye with the right eye and the left eye separately and to view the image stereoscopically.

Then, the output control unit 124 obtains the parallax in the case of viewing the evaluation results (including the three-dimensional coordinates themselves) of the rectangular parallelepipeds, the vectors, etc on the three-dimensional coordinates from the predetermined positions (virtual viewpoints), generates the image for the right eye and the image for the left eye so as to contain this parallax and transmits and displays these images to and on the stereoscopic display device.

Figure 36A:
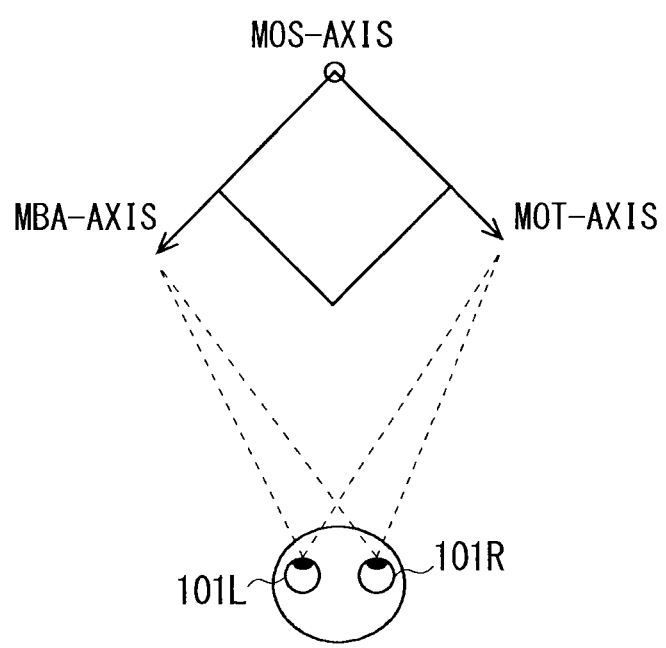
FIG. 36A-36C are explanatory diagrams of an image having a parallax.
Figure 36B:
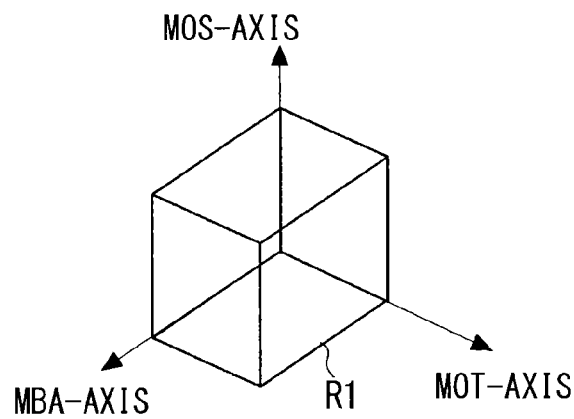
Figure 36C:
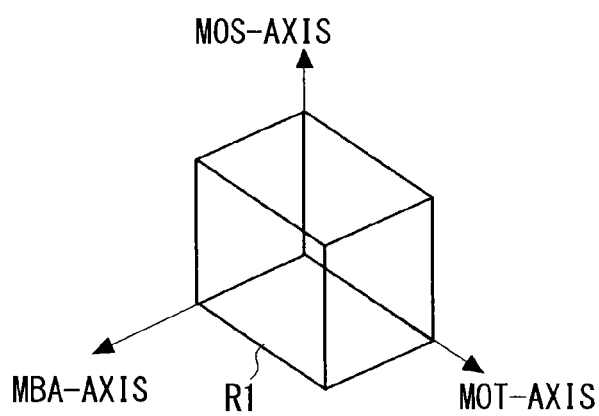

FIG. 36 is an explanatory diagram of the images containing the parallax. The output control unit 124, as depicted in FIG. 36A, in the case of generating the image of a rectangular parallelepiped R1 on the three-dimensional coordinates, generates the image of the rectangular parallelepiped R1 when viewing from a virtual viewpoint 101 located apart at a predetermined distance from the rectangular parallelepiped R1. Herein, the image for the right eye is the image in the case of viewing the rectangular parallelepiped R1 from a right eye position 101R of the user existing at the virtual viewpoint 101. Further, the image for the left eye is the image in the case of viewing the rectangular parallelepiped R1 from a left eye position 101L of the user existing at the virtual viewpoint 101. That is, the image for the right eye and the image for the left eye correspond to a view field in the case of viewing the rectangular parallelepiped from the positions apart from each other at a distance of a width (e.g., 50 mm-70 mm) between the eyes in the horizontal direction. FIG. 36B is a diagram illustrating an example of the image for the right eye, and FIG. 36C is a diagram illustrating an example of the image for the left eye. In FIG. 36B, the right side surface of the rectangular parallelepiped appears wider than in FIG. 36C because of the image being viewed by the right eye. Whereas in FIG. 36C, the left side surface of the rectangular parallelepiped appears wider than in FIG. 36B because of the image being viewed by the left eye. Note that the parallax is displayed in exaggeration for the sake of the explanation in FIGS. 36B and 36C.

Thus, the evaluation device 1 expresses the balances of the respective indices not on the plane but as the stereoscopic form, generates and outputs the rectangular parallelepipeds and the image for the right eye and the image for the left eye of the vectors as the evaluation results to the stereoscopic display in order to further facilitate the grasp of the evaluation results for the entrepreneur, thereby enabling the evaluation results to be displayed stereoscopically.

In FIG. 6, the plurality of evaluation periods is preset, however, the evaluation device 1 according to the first embodiment may, if a certain period and a target value of this period are inputted, segment this period into a plurality of short periods and set respective target values (short period target values). Then, the evaluation device 1, if each of the short period target values diverges from each performance value, may reallocate the management resources according to an allocation table.

Figure 10:
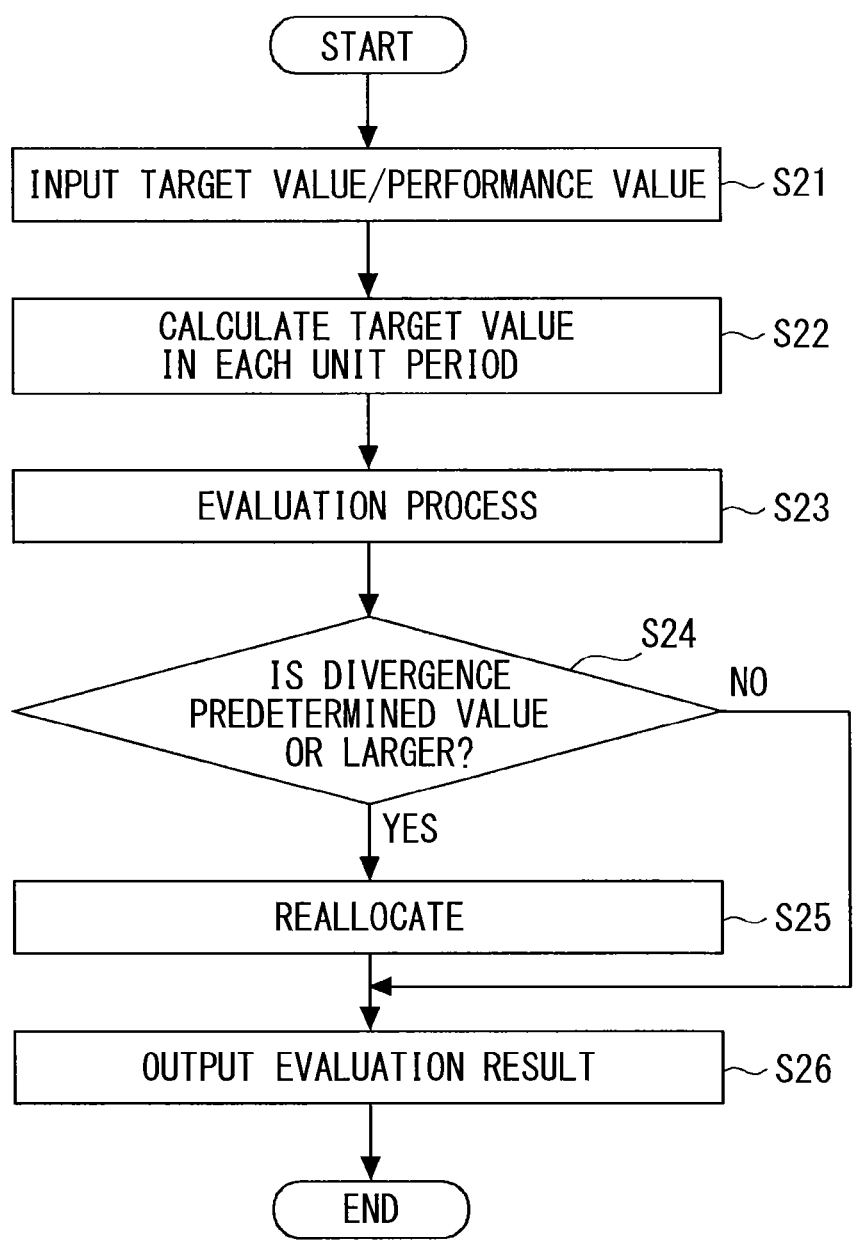
FIG. 10 is an explanatory flowchart of the evaluation method executed by the computer-based evaluation device according to the evaluation program.

FIG. 10 is an explanatory flowchart of the evaluation method executed by the computer-based evaluation device 1 according to the evaluation program. The evaluation method in FIG. 10 is different from the evaluation method in FIG. 6 in terms of a process of setting the short period target values and a process of reallocating the management resources on the basis of the allocation table if unable to attain the respective short period target values.

In the evaluation device 1, upon receiving the boot command through the user's operation, the arithmetic processing unit 12 reads the evaluation program from the storage unit 13 and executes the evaluation program, thereby starting processes in FIG. 10.

At first, the target accepting unit 121 accepts inputting the target value of the MBA index after the lapse of the predetermined period, the target value of the MOT index after the lapse of the predetermined period and the target value of the MOS index after the lapse of the predetermined period, and stores these values in the storage unit 13 or the memory (step S21).

Next, the target calculation unit 125 calculates, based on the inputted target values after the lapse of the predetermined period, respective target values in the unit periods reaching the predetermined period (step S22). For example, if the inputted target value is the target value of the fiscal year, the target value per quarter is calculated. Herein, the target value of each unit period is calculated by dividing the target value after the predetermined period by a period of time up to each unit period. For instance, if the target value of the fiscal year is 10 points, the target value of the first quarter is given 2.5 points that are one-fourth, the target value of the second quarter is given 5 points that is one-half, and the target value of the third quarter is given 7.5 points that are three-fourths. Further, the allocation of the quarter is determined beforehand, and the calculation may be done based on the allocation stored in the storage unit 13.

Next, the evaluation unit 123 obtains the target vector of the enterprise value on the basis of the target values inputted in step S21 and the respective target values of the individual unit periods calculated in step S22 (step S23). Herein, let xn be the target value of the MBA index in the n-th evaluation period, let yn be the target value of the MOT index in the n-th evaluation period and let zn be the target value of the MOS index in the n-th evaluation period, and the target vector of the enterprise value in the first evaluation period is defined such that a start point is given by the origin, and a terminal point (tip) is given by (x1, y1, z1). Then, in the first embodiment, the target vector of the enterprise value in the second evaluation period is defined such that the start point is given by the origin, and the terminal point (tip) is given by (x1+x2, y1+y2, z1+z2). Similarly, the target vector of the enterprise value in the third evaluation period is defined such that the start point is given by the origin, and the terminal point (tip) is given by (x1+x2+x3, y1+y2+y3, z1+z2+z3). Namely, in the case of inputting the target values of one year and calculating the target values of the first quarter through the third quarter, four lines of target vectors of the enterprise value are acquired.

Figure 11:
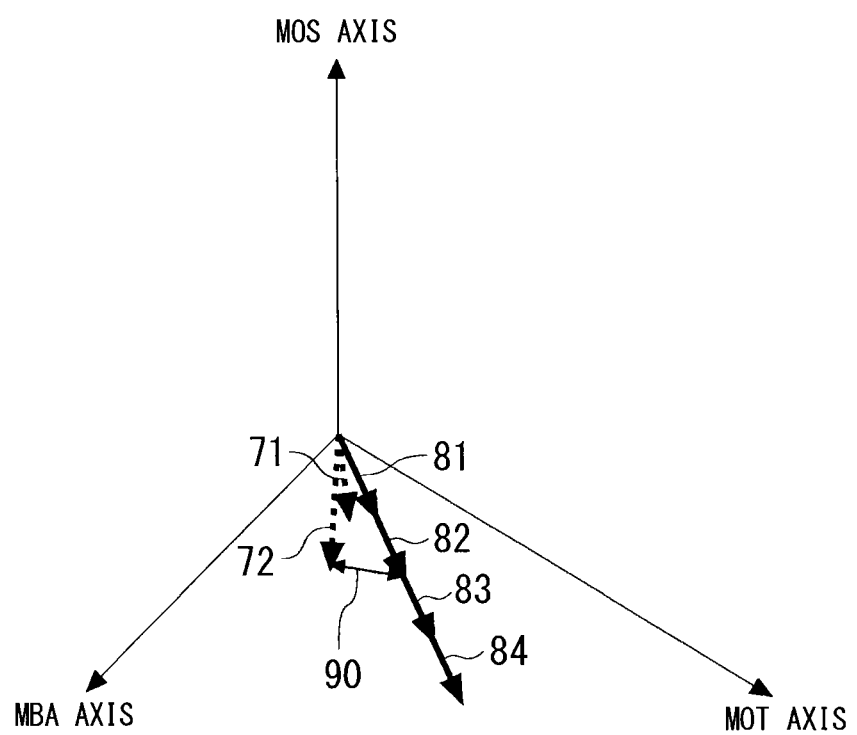
FIG. 11 is a diagram illustrating a display example of the respective target vectors.

FIG. 11 is a diagram illustrating a display example of the respective target vectors. In FIG. 11, an arrow 81 represents a target vector of the enterprise value in the first quarter; in FIG. 11, an arrow 82 represents a target vector of the enterprise value in the second quarter; in FIG. 11, an arrow 83 represents a target vector of the enterprise value in the third quarter; and in FIG. 11, an arrow 84 represents a target vector of the enterprise value in the fiscal year. Similarly, an arrow 71 represents a performance vector of the enterprise value in the first quarter; and an arrow 72 represents a performance vector of the enterprise value in the second quarter.

Then, the evaluation unit 123 obtains a divergence (distance) 90 between the tip of the target vector (the arrow 82) of the enterprise value in the second quarter and the tip of the performance vector (the arrow 72) of the enterprise value in the second quarter, and determines whether this divergence 90 is equal to or larger than a predetermined value or not (step S24).

If the divergence 90 is equal to or larger than the predetermined value, the resource allocation setting unit 127 obtains, from the allocation table, the resource allocation associated with the index exhibiting the maximum divergence between the performance value and the target value among the MBA index, the MOT index and the MOS index in the second quarter (step S25).

FIG. 12 is a diagram illustrating an example of the allocation table. In the example of FIG. 12, the index exhibiting the maximum divergence, the value (magnitude) of the divergence and allocation rates of the respective indices are stored in the way of being associated with each other.

For example, if the divergence between the target value and the performance value of the MOT index is the maximum and if this value is equal to or larger than 4 but less than 6, a row 61 of the allocation table is selected, in which associated allocation rates acquired herein are +20% given to MOT, −10% given to MBA and −10% given to MOS.

Moreover, if the divergence between the target value and the performance value of the MOS index is the maximum and if this value is equal to or larger than 6 but less than 8, a row 66 of the allocation table is selected, in which the associated allocation rates acquired herein are −10% given to MOT, −15% given to MBA and +25% given to MOS.

Figure 13:
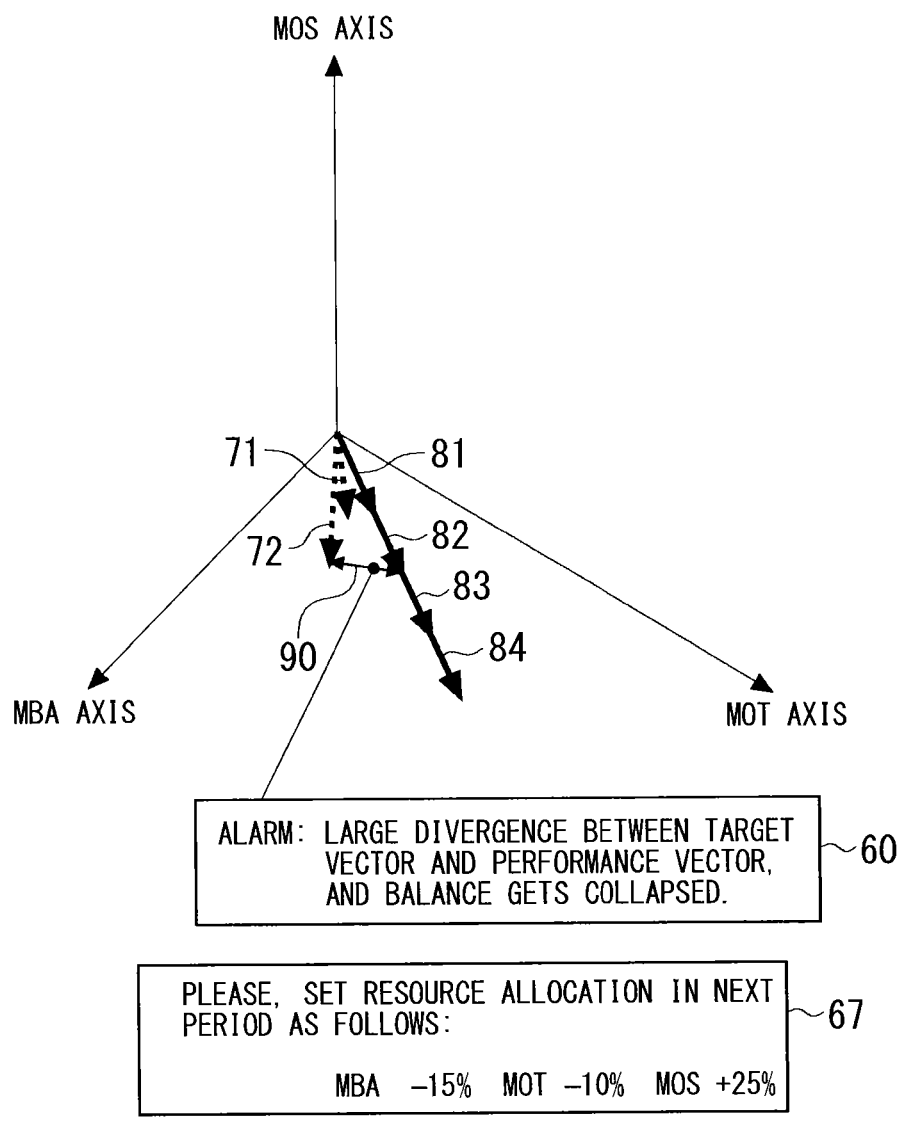
FIG. 13 is a diagram illustrating a display example of the target vectors and the performance vectors in a plurality of periods.

Then, the output control unit 124, as illustrated in FIG. 13, renders the target vector and the performance vector of the enterprise value on the three-dimensional coordinates, and displays an alarm 60 and a changed allocation rate 67 on the display device (step S26). Whereas if the divergence 90 between the target vector of the enterprise value and the performance vector of the enterprise value is smaller than the predetermined value, the target vector of the enterprise value and the performance vector of the enterprise value are displayed without issuing the alarm and making the reallocation (step S26).

Thus, according to the first embodiment, the evaluation is conducted for every quarter, and if the divergence between the target vector and the performance vector increases, the balance is improved by changing an investment rate of the next quarter, thereby enabling the support to be done to facilitate the attainment of the target value after the predetermined period.

<Second Embodiment>

A second embodiment is different from the first embodiment discussed above in terms of having a function of adjusting a length of one scale on each of the MBA axis, the MOT axis and the MOS axis, but other configurations are the same. Therefore, the same elements are marked with the same numerals and symbols, and the redundant explanations thereof are omitted.

Figure 14:
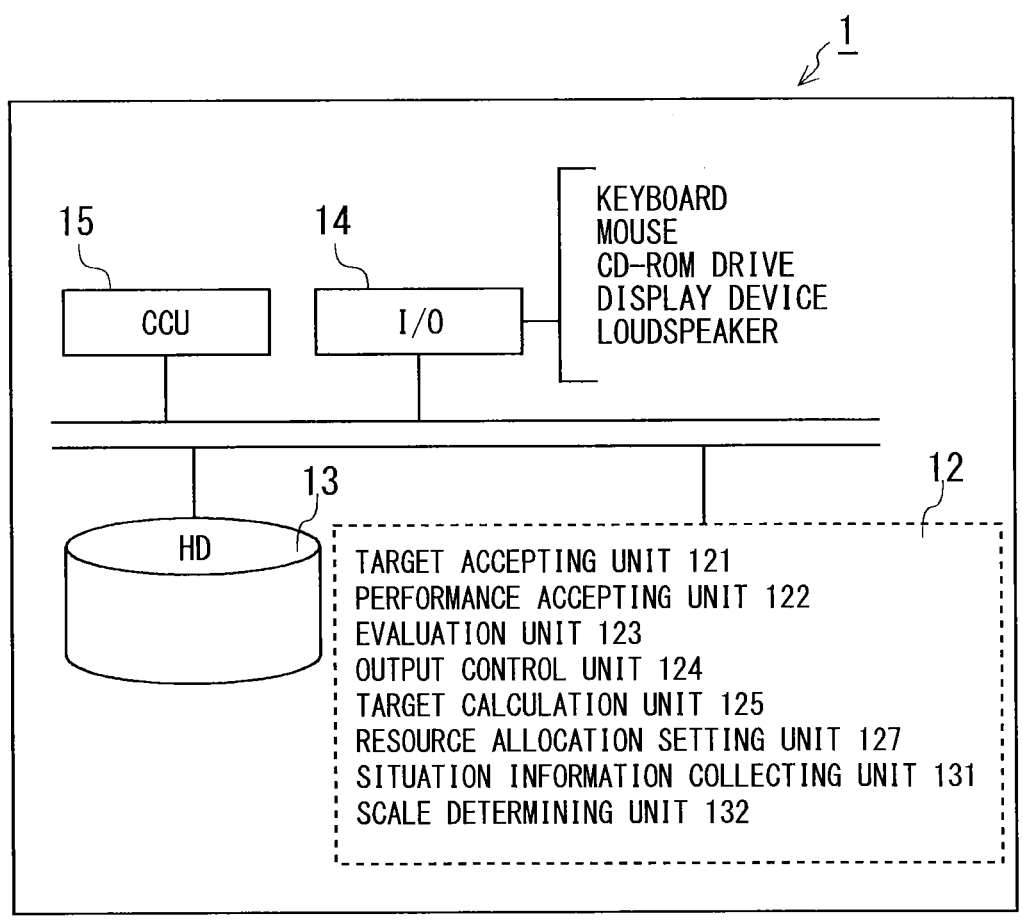
FIG. 14 is a schematic diagram of architecture of the evaluation device for the enterprise value in a second embodiment.

FIG. 14 is a schematic diagram of architecture of the evaluation device 1 which evaluates the enterprise value in the second embodiment. The evaluation device 1 in the second embodiment further includes a situation information collecting unit 131 and a scale determining unit 132 as compared with the system in FIG. 1. Further, the storage unit 13 is stored with a weight table in which a per-scale length of at least one axis among the MBA axis, the MOT axis and the MOS axis is associated with the situation information.

The situation information collecting unit 131 acquires the situation information pertaining to a situation from a predetermined information output source. For instance, an input by, with a predetermined evaluator being an information source, this evaluator is acquired as the situation information. In this case, a consultative body such as a scale adjustment committee is organized by the evaluators in the respective fields related to MBA, MOT and MOS, in which the evaluators consult the situation concerning the scale adjustment and input the consulted situation as the situation information. Further, the situation information collecting unit 131 may acquire the situation information by extracting this information under a predetermined condition from a database serving as an information source of a research institution (a think tank) or a consulting firm. Herein, the "elongation of the scale" implies increasing the per-scale length on the axis, and, for example, this length is increased when a degree of difficulty for attainment rises. For instance, if the scale length is increased by 50% (a scale ratio+50%), e.g., the performance value given 4 points is expressed as 6 points when plotted on a pre-modifying graph as a result of modifying the scale on the axis. Namely, even if the points are the same, the performance vector is rendered long when elongating the scale. Further, the performance value may also be acquired by referring the performance vector to the post-adjustment scale. For example, if the performance vector with the performance value being equivalent to 4 points is acquired in the status exhibiting a high degree of difficulty for attainment, the evaluation may be done as a 6-point performance value by increasing the scale length by 50%.

While on the other hand, the "shortening of the scale" implies decreasing the per-scale length on the axis, and, if the degree of difficulty for attainment decrease, this length is shortened. For instance, if the scale length is shortened by 20% (the scale ratio−20%), e.g., the performance value given 10 points is expressed as 8 points when plotted on the pre-modifying graph as a result of modifying the scale on the axis. Namely, even if the points are the same, the performance vector is rendered short when shortening the scale. Further, the performance value may also be acquired by referring the performance vector to the short-adjusted scale. For example, if the performance vector with the performance value being equivalent to 10 points is acquired in the status exhibiting a low degree of difficulty for attainment, the evaluation may be done as an 8-point performance value by shortening the scale length by 20%.

The situation information collecting unit 131 may automatically acquire the situation information from the computers on the network such as the Internet. For example, the situation information collecting unit 131 is connected to the computers serving as the information output sources via the network and reads the documents stored on the computers. Note that destinations of the connections such as websites of news media like newspaper publishing companies, broadcasting stations, etc, websites of academic bodies like the universities, research laboratories, etc and data servers for providing data of treatises etc, are specified IP addresses and URLs, and are stored on the storage unit 13 beforehand. The situation information collecting unit 131 connects with the computers as the information output sources according to the IP addresses and the URLs, and reads documents specified by the URLs, documents stored in folders specified by the URLs, documents linking to web pages specified by the URLs and documents matching with predetermined keywords from the computers.

Then, the situation information collecting unit 131 extracts words related to the situation from the document, then obtains a score of the word on the basis of a position or/and a word count in the document and, if the score is equal to or larger than the threshold value, sets this word as the situation information. The words related to the situations are exemplified by, e.g., words related to the fluctuations in situation of the MBA such as fluctuations in the exchange rate, the interest rate and the stock price fluctuation rate, words related to the fluctuations in situation of the MOT such as the nano technology, the solar battery and the processor and words related to the fluctuations in situation of the MOS such as the environment, the resources, the populations and the sustainability, and these words are previously stored on the storage unit 13. If the word such as this is positioned in the first sentence or the last sentence or the heading, this word is important in many cases, so that a score is added. Further, if the word related to the fluctuations in situation is contained in one document a predetermined number of times or more, the score is added. Moreover, if co-occurring with a specified word such as the exchange rate and Yen-Dollar, and the interest rate of the currency and EURO, the score is added. Thus, the score of the word is calculated, and, if equal to or larger than the threshold value, this word is adopted as the situation information. Further, if the words related to the situation are the exchange rate, the interest rate, the price increase rate, the stock price fluctuation rate, the market price of the crude oil, etc, the fluctuation rate is obtained by comparing the values in the document with the values of the preceding fiscal year.

The scale determining unit 132 obtains the per-scale length of at least one axis among the MBA axis, the MOT axis and the MOS axis in a way that corresponds to the situation information acquired by the situation information collecting unit 131 while referring to the weight table. Moreover, the scale determining unit 132 determines the scale for every evaluation period by obtaining the per-scale length with respect to the plurality of evaluation periods.

Then, the output control unit 124 renders the performance vector of the enterprise value in each of the plurality of evaluation periods, e.g., the enterprise value of each fiscal year of the first fiscal year through the fifth fiscal year on the same three-dimensional coordinates based on the scale for every evaluation period, which is determined by the scale determining unit 132.

FIG. 15 is a diagram illustrating an example of the weight table that is stored with the situation information and the scale ratio in the way of being associated with each other. Herein, the scale ratio is indicated by a rate on which the per-scale length is based. For example, the rate is +10% in the case of increasing the scale length by 10% but is −10% in the case of decreasing the scale length by 10%.

FIG. 15A is the weight table of the MBA axis. The scale determining unit 132, if the situation information acquired by the situation information collecting unit 131 corresponds to two or more items of situation information in FIG. 15A, adjusts the scale on the MBA axis from the next fiscal year onward, corresponding to the scale ratio.

For example, if applied to a case (1) in which a currency fluctuation that is 20% or more occurs in any one of key currency exchange rates (yen-dollar, yen-EURO, dollar-EURO, RMB-dollar) and to a case (2) in which the currency fluctuation that is 100% or more occurs a key currency interest (yen, EURO, dollar, RMB), the respective scale ratios are added to elongate the scale by 10% from the next fiscal year onward.

Similarly, the scale from the next fiscal year onward is adjusted in a case (3) where main price increase rates (the price increase rates of Japan, U.S.A., China, Europe and Brazil) are 30% or more, a case (4) where volatilities of stock prices of the main markets (the volatilities of the stock prices in NY, London, Tokyo, Singapore, Shanghai) decrease by 30% or more, and a case (5) where market prices of crude oils (the market prices of crude oils of Dubai, WTI and North sea) increase by 50% or more. Note that if applied to the three or more items, the respective scale ratios are added into +15%, +20%, etc or may not be added any further by setting an upper limit.

Furthermore, FIG. 15B is the weight table of the MOT axis. The scale determining unit 132, if the situation information acquired by the situation information collecting unit 131 is applied to the items of the situation information in FIG. 15B, adjusts the scale on the MOT axis from the next fiscal year onward corresponding to the scale ratios.

For instance, (1) if a subject in the basic science involving a long-term development is attained by the evaluation target company itself or other companies, a significance of the development related to this subject is lost, and hence the scale from the next fiscal year onward is shortened by 10%. Incidentally, the subject in the basic science involving the long-term development may arbitrarily be set, and, themes of studies for, e.g., a nanotechnology, photonic crystal, a quantum computer, etc are specifically set.

Similarly, (2) in the case of attaining a subject of a core technology (technologies such as a catalyst, a solar cell and a processor), the scale from the next fiscal year onward is shortened by 10%.

Further, (3) in the case of attaining an application technology involving an intermediate and short term development (the developments of, e.g., a new product A and a new product B), or (4) in the case of carrying out an operation technology involving accumulations of the developments (an obviation of the problem of the product A and a manufacture of the product B using the recycle material) on a daily basis, the purpose of the development is similarly lost, and hence the scale from the next fiscal year onward is shortened by 5%.

Even if the scale on the MOT axis is shortened because of attaining the technical subject as described above and if a target of the development is set by adding a new subject, the length of the scale on the MOT axis can be reset to the original.

For example, (5) in the case of newly setting a development target in the basic science involving the long-term development, or (6) in the case of newly setting a development target in the core technology involving the long-term development, i.e., in the case of inputting the situation information purporting that the setting of these development targets is done, the length of the MOT axis is increased by 10%.

Moreover, (7) in the case of setting a new development target in the application technology involving the intermediate and short term development, or (8) in the case of setting a new subject in the operation technology involving the accumulations of the developments on the daily basis, the scale from the next fiscal year onward is similarly elongated by 5%.

Further, FIG. 15C is the weight table of the MOS axis. The scale determining unit 132, if the situation information acquired by the situation information collecting unit 131 is applied to the items of the situation information in FIG. 15C, adjusts the scale on the MOS axis from the next fiscal year onward corresponding to the scale ratios.

For example, (1) the scale determining unit 132, if there is an input of making an international agreement recognized to have effectiveness with respect to the item pertaining the sustainability, shortens the scale from the next fiscal year onward by 10% because of a decline of the purpose for promoting the MOS. Note that the item pertaining to the sustainability is exemplified by the resources such as the energy, water, foods and rare materials, and the environment, populations, or poverty.

Furthermore, (2) the scale determining unit 132, if one of the subjects related to the sustainability is considered to be solved by an innovation and a discovery (of the resource), shortens the scale from the next fiscal year onward by 10% because of the decline of the purpose for promoting the MOS similarly to the previous case. For instance, in the case of there being the input of the situation information purporting that one of the subjects related to the sustainability is solved, and in the case of extracting the situation information purporting that the solution is acquired from the database etc, the scale determining unit 132 shortens the scale from the next fiscal year onward.

On the other hand, the scale determining unit 132, if a subject related to the sustainability is deemed to be added due to an occurrence of a predetermined situation such as a disaster and a war, elongates the scale from the next fiscal year onward by 10%. For example, in the case of there being an input of the situation information purporting that the subject is added, and in the case of extracting, from the database, the situation information purporting that the subject is added, it follows that the purport (significance) for promoting the MOS is enhanced, and therefore the scale determining unit 132 elongates the scale from the next fiscal year onward.

Figure 16:
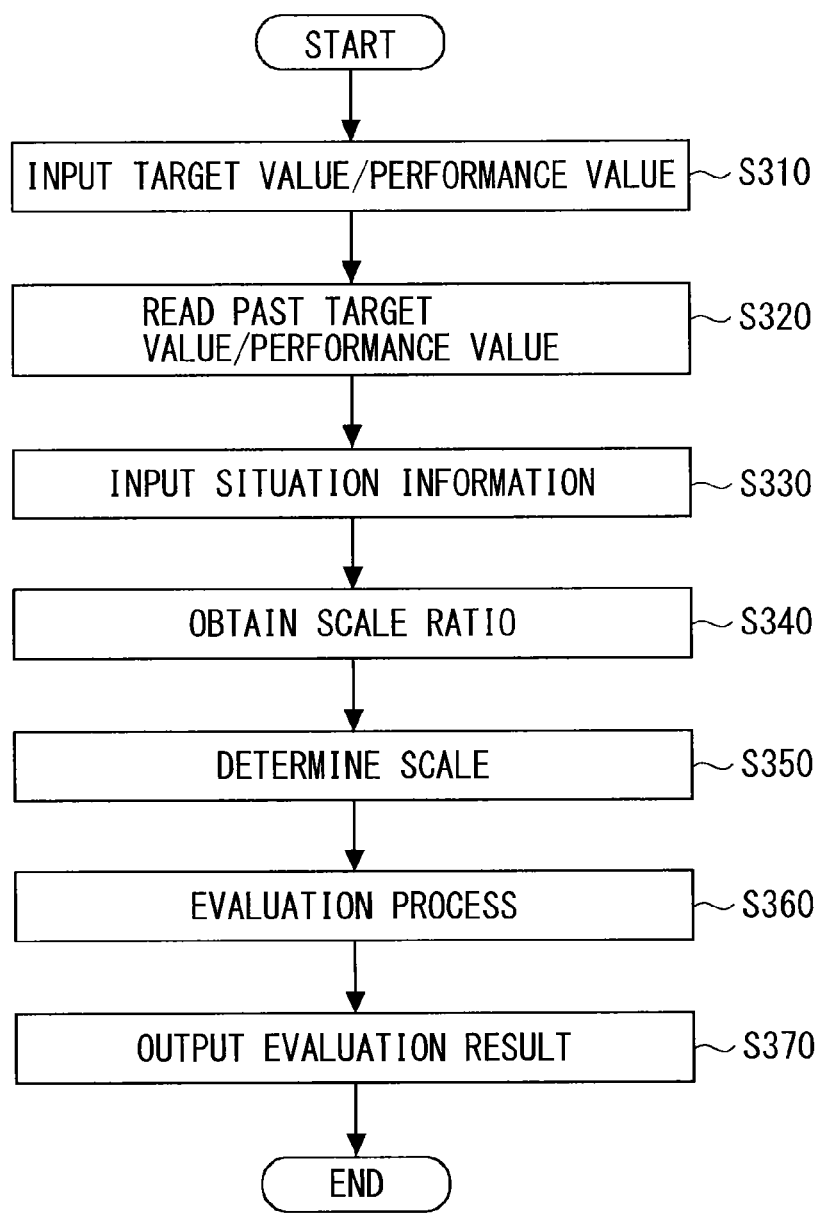
FIG. 16 is an explanatory flowchart of the evaluation method in a second embodiment, which is executed by the evaluation device in accordance with the evaluation program.

FIG. 16 is an explanatory flowchart of the evaluation method in the second embodiment, which is executed by the computer-based evaluation device 1 in accordance with the evaluation program.

In the evaluation device 1, upon receiving the boot command through the user's operation etc, the arithmetic processing unit 12 reads the evaluation program from the storage unit 13 and executes the evaluation program, thereby starting processes in FIG. 16.

To start with, the target accepting unit 121 accepts inputting the target value of the MBA index, the target value of the MOT index and the target value of the MOS index, and stores these values in the storage unit 13 or the memory. Further, the performance accepting unit 122 accepts inputting the performance value of the MBA index, the performance value of the MOT index and the performance value of the MOS index, and stores these values in the storage unit 13 or the memory (step S310). Note that if the target value etc, if already inputted to the storage unit 13, is read from the storage unit 13.

Furthermore, the evaluation unit 123 reads the performance values and the target values of the MBA index, the MOT index and the MOS index with respect to the plurality of past evaluation periods from the storage unit 13 (step S320).

Next, the situation information collecting unit 131 acquires the situation information extracted from the predetermined information output source, e.g., the computer via the network and from the database or the situation information inputted by the predetermined evaluator (step S330).

The scale determining unit 132 obtains the scale ratios of the MBA axis, the MOT axis and the MOS axis corresponding to the situation information acquired by the situation information collecting unit 131 by referring to the weight table (step S340).

Then, the scale determining unit 132 determines the scale per evaluation period by obtaining the per-scale length with respect to the plurality of evaluation periods. For example, if the situation information of the second fiscal year is applied to the weight table in FIG. 15, the scale determining unit 132 determines the scale of each axis from the third fiscal year onward according to the ratio obtained in step S340 (step S350).

Next, the evaluation unit 123 obtains the target vector of the enterprise value and the performance vector of the enterprise value on the basis of the target value of the MBA index, the target value of the MOT index and the target value of the MOS index and on the basis of the performance value of the MBA index, the performance value of the MOT index and the performance value of the MOS index, which are inputted in step S310. Further, the evaluation unit 123 obtains the performance vector of the enterprise value and the target vector of the enterprise value on the basis of the target value of the MBA index, the target value of the MOT index and the target value of the MOS index and on the basis of the performance value of the MBA index, the performance value of the MOT index and the performance value of the MOS index in the plurality of past evaluation periods (step S360). Herein, let xn be the target value of the MBA index in the n-th evaluation period, let yn be the target value of the MOT index in the n-th evaluation period and let zn be the target value of the MOS index in the n-th evaluation period, and the target vector of the enterprise value in the first evaluation period is defined such that the start point is given by the origin, and the terminal point (tip) is given by (x1, y1, z1). Then, in the second embodiment, the target vector of the enterprise value in the second evaluation period is defined such that the start point is given by the origin, and the terminal point (tip) is given by (x1+x2, y1+y2, z1+z2). Similarly, the target vector of the enterprise value in the third evaluation period is defined such that the start point is given by the origin, and the terminal point (tip) is given by (x1+x2+x3, y1+y2+y3, z1+z2+z3). Further, the performance vector is obtained in the same way.

Figure 17:
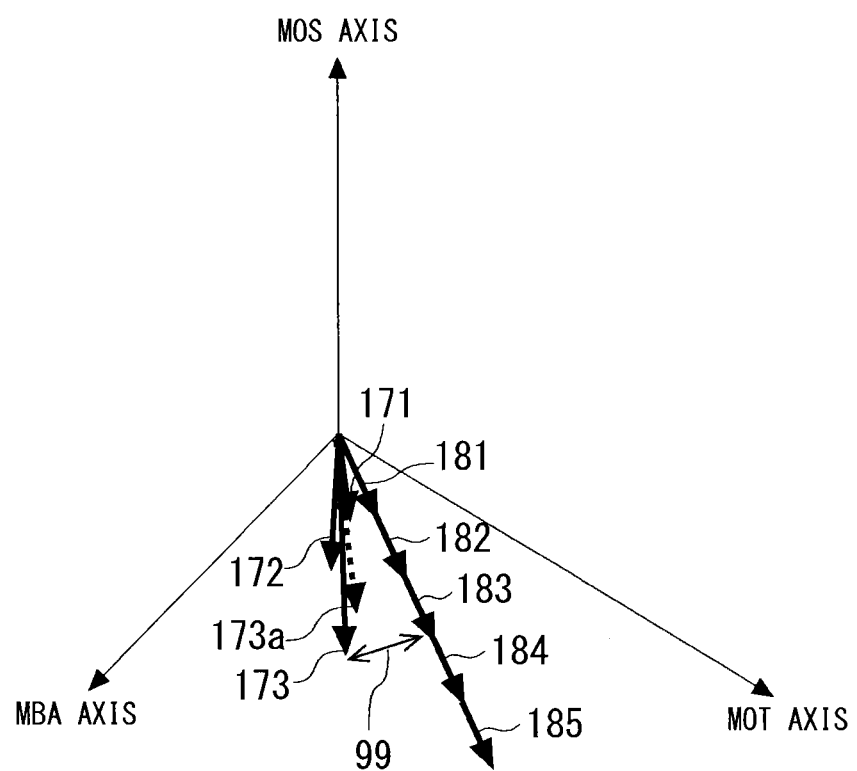
FIG. 17 is a diagram illustrating a display example of the target vectors and the performance vectors in the plurality of periods.

Then, the output control unit 124 renders the performance vector of the enterprise value in each of the plurality of evaluation periods, e.g., the enterprise value of each fiscal year of the first fiscal year through the fifth fiscal year on the same three-dimensional coordinates based on the scale for every evaluation period, which is determined in step S350 (step S370). FIG. 17 is a diagram illustrating the performance vector on the year-by-year basis. In FIG. 17, an arrow 181 indicates the target vector of the first fiscal year, an arrow 182 indicates the target vector of the second fiscal year, an arrow 183 indicates the target vector of the third fiscal year, an arrow 184 indicates the target vector of the fourth fiscal year, and an arrow 185 indicates the target vector of the fifth fiscal year. Further, the performance vector of the first fiscal year is indicated by an arrow 171, the performance vector of the second fiscal year is indicated by an arrow 172, and the performance vector of the third fiscal year is indicated by an arrow 173.

Note that an arrow 173*a* represents the performance vector of the third fiscal year, which is indicated by the pre-adjusting scale. The arrow 173 represents the performance vector of the third fiscal year, which is indicated by the scale adjusted to be elongated corresponding to the situation information, in which the weight corresponding to the situation is reflected in the magnitude thereof.

Further, the output control unit 124 may display the evaluation results by automatically adjusting the directions on the three-dimensional coordinates on the occasion of displaying the evaluation results.

In the evaluation device 1 according to the present embodiment, the degree of attainment is indicated by the magnitude of the divergence between the tip of the performance vector and the tip of the target vector of the enterprise value, however, if there is a divergence in the direction perpendicular to, e.g., the display surface of the display device, the magnitude of the divergence cannot be known even by seeing the display on the display device. Namely, if different in the direction of the divergence between the tip of the performance vector and the tip of the target vector of the enterprise value, even the same distance of the divergence appears to be different, resulting in a difficulty of confirming the evaluation result.

Hence, the output control unit 124, e.g., when the operator selects the first evaluation period and displays the performance vector and the target vector of the enterprise value on the display device, the display image can be generated by setting the directions on the three-dimensional coordinates so that the line connecting the tip of the performance vector to the tip of the target vector of the enterprise value in the first evaluation period becomes parallel with the display surface of the display device.

Figure 37A:
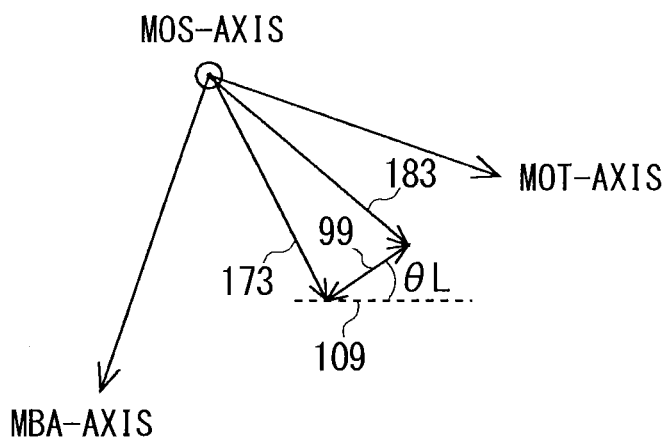
FIG. 37A, 37B are diagrams illustrating a target vector and a performance vector in FIG. 17 on an MBA-MOT plane.
Figure 37B:
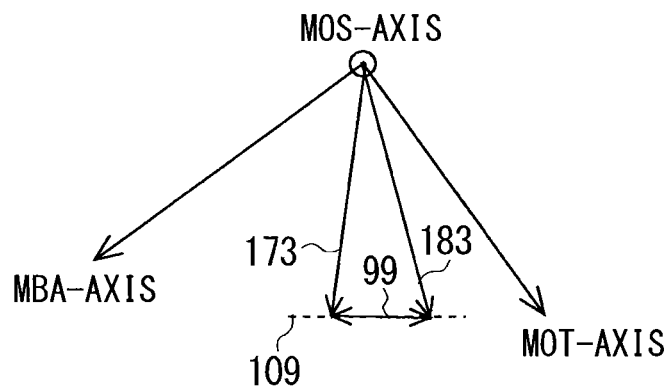

FIG. 37 is a diagram illustrating a target vector 183 and a performance vector 173 in FIG. 43 on the MBA-MOT plane. In FIG. 37A, a dotted line 109 represents the line parallel with the display surface of the display device, and a line 99 connecting the tip of the target vector 183 to the tip of the performance vector 173 is inclined at an angle θL to the display surface of the display device. In this case, the output control unit 124, as illustrated in FIG. 37B displays the line 99 connecting the tip of the target vector 183 to the tip of the performance vector 173 in parallel with the display surface of the display device by inclining the directions on the three-dimensional coordinates at the angle θL based on the center of the MOS-axis.

The magnitude of the divergence between the tip of the performance vector and the tip of the target vector of the enterprise value can be thereby confirmed invariably under the same conditions.

Thus, according to the second embodiment, when comparing the performance vectors in the plurality of periods, in the case of a strict situation to increase the performance, the performance can be indicated by a magnitude taking account of this weight, and it is therefore feasible to intuitively grasp the transitions of the performance based on the situation.

<Modified Example>

In the second embodiment, the scale ratio is obtained from the performance information, however, without being limited to this information, the scale ratio may also be obtained corresponding to an input of a keyword. Note that the present modified example is different from the second embodiment in terms of a procedure of obtaining the scale ratio, but other configurations are the same. Therefore, the same elements are marked with the same numerals and symbols, and the redundant explanations thereof are omitted.

Figure 18:
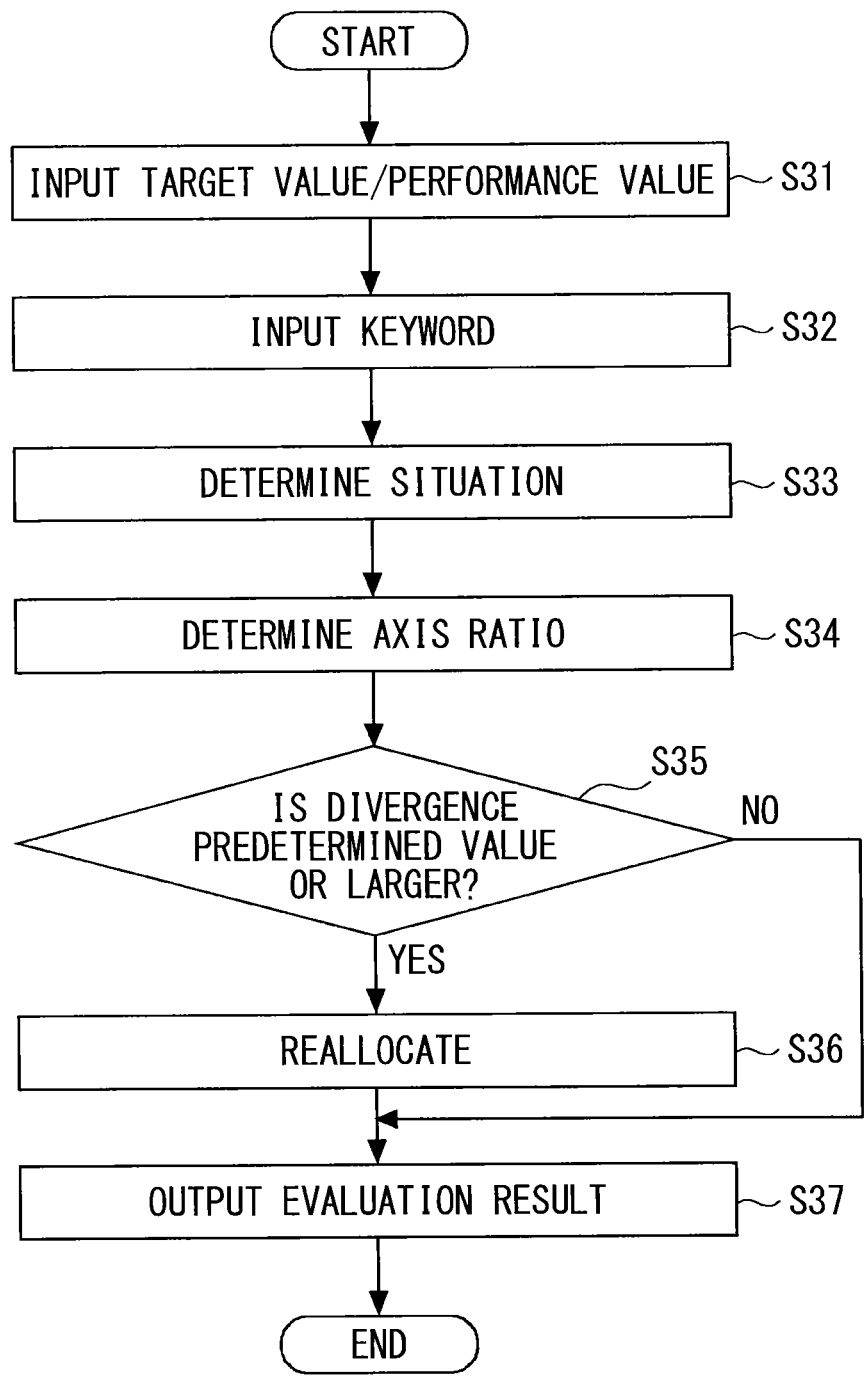
FIG. 18 is an explanatory flowchart of the evaluation method in a modified example of the second embodiment, which is executed by the evaluation device in accordance with the evaluation program.

FIG. 18 is an explanatory flowchart of the evaluation method in the modified example, which is executed by the computer-based evaluation device 1 in accordance with the evaluation program.

In the evaluation device 1, upon receiving the boot command through the user's operation etc, the arithmetic processing unit 12 reads the evaluation program from the storage unit 13 and executes the evaluation program, thereby starting processes in FIG. 18.

To start with, the target accepting unit 121 accepts inputting the target values of the MBA index, the MOT index and the MOS index in the plurality of periods, i.e., the first fiscal year through the fifth fiscal year in the present modified example and also the performance values thereof up to the present point of time, and stores these values in the storage unit 13 or the memory (step S31).

Next, a keyword symbolizing the fiscal year about which the evaluation is implemented is inputted (step S32). For instance, data of a newspaper issued in the fiscal year concerned is inputted, and a word contained in the headline is extracted and set as a keyword. Alternatively, a predetermined number of search keywords in predetermined fields such as the economy, the environment and the technology are acquired from a search engine in the sequence from the highest of frequency. This being the case, there is inputted a plurality of keywords (a keyword group) taken as topics in the fiscal year concerned such as a DRAM, anathermal, a tablet terminal and a smartphone.

These keywords can be associated with the situations in the world such as a keyword taken as the topic when focusing on the environmental problem and the keyword used when the economic situation is hard. FIG. 19 is a diagram illustrating an example of a table in which the situations are associated with the keywords.

The evaluation unit 123 obtains a situation associated with the keyword group inputted in step S32 by referring to this associative table (step S33). For example, the keywords related to the environmental problem such as the anathermal, an depletion of the oil and the ozone hole are associated with a situation 1; the keywords related to the economic stagnation such as a denomination and a simultaneous drop in global stock prices are associated with a situation 2; and the keywords related to a decrease in capability of technology such as a deficiency of researchers, a generation educated with latitude and hollowing out of industry are associated with a situation 3, thus obtaining the situations associated with the keywords, i.e., the present situations.

Further, the evaluation unit 123 acquires the ratio of each axis corresponding to the present situation by referring to the weight table (step S34). FIG. 20 is a diagram illustrating an example of the weight table. The weight table is structured so that the situations obtained in step S33 are associated with the scale lengths of the respective axes such as the MBA axis, the MOT axis and the MOS axis, i.e., the rates against the reference scale in this example.

For example, if the situation obtained in step S33 is the situation 1, the scale of the MBA is set to 0% by referring to the weight table, the scale of the MOT is likewise set to +5%, and the scale of the MOS is likewise set to +10%. Furthermore, if being the situation 3, the scale of the MBA is set to −5% by referring to the weight table, the scale of the MOT is likewise set to +50%, and the scale of the MOS is likewise set to +5%. Thus, for instance, if the performance is raised in a hard situation and a highly focused situation by changing the per-scale length of each axis corresponding to the situation, this performance can be evaluated as a much larger vector.

Then, the evaluation unit 123 obtains a divergence 99 between the tip of the performance vector 173 and the tip of the target vector 183, which are evaluated based on the post-changing scale (FIG. 17), and determines whether this divergence 99 is equal to or larger than a predetermine value or not (step S35).

If the divergence 99 is equal to or larger than the predetermine value, the resource allocation setting unit 127 obtains, from the allocation table, the resource allocation corresponding to the index exhibiting the maximum divergence 99 between the performance value and the target value among the MBA index, the MOT index and the MOS index in the third fiscal year (step S36).

Then, the output control unit 124 renders the target vector and the performance vector of the enterprise value on the three-dimensional coordinates illustrated in FIG. 17, and gets the display device to display an alarm 60 and a changed allocation rate 67 similarly to FIG. 13 (step S37). On the other hand, if the divergence 99 between the target value and the performance value is less than the predetermined value in step S35, the target vector and the performance vector of the enterprise value are displayed without issuing the alarm and making the reallocation (step S37).

Note that the scale ratio of each axis is obtained based on the keyword and the weight table in the present modified example, however, without being limited to this method, other methods may also be employed. For instance, a mail is transmitted to the predetermined evaluator such as an executive; the evaluator transmits back the mail to which the weight of each axis is inputted in numerical value; the evaluation device 1 receives this mail; and the scale ratio of each axis may be taken by averaging the numerical values of the weights of the respective axes.

As described above, according to the present modified example, the evaluation can be done by taking the weight associated with the situation into consideration.

<Third Embodiment>

In the first embodiment and the second embodiment, the four-dimensional evaluation is conducted in a way that adds the timewise change to the evaluation based on the three-dimensional coordinates of the MBA axis, the MOT axis and the MOS axis, however, the evaluation is not necessarily limited to the four-dimensional evaluation. A third embodiment is that a three-dimensional evaluation is carried out by rendering the performance vectors of the enterprise value on the three-dimensional coordinates of the MBA axis, the MOT axis and the MOS axis. Note that the third embodiment is different from the first embodiment discussed above in terms of the evaluation process, but other configurations are the same, and therefore the same elements are marked with the same numerals and symbols, while the redundant explanations thereof are omitted.

<Three-Dimensional Evaluation Method>

Figure 21:
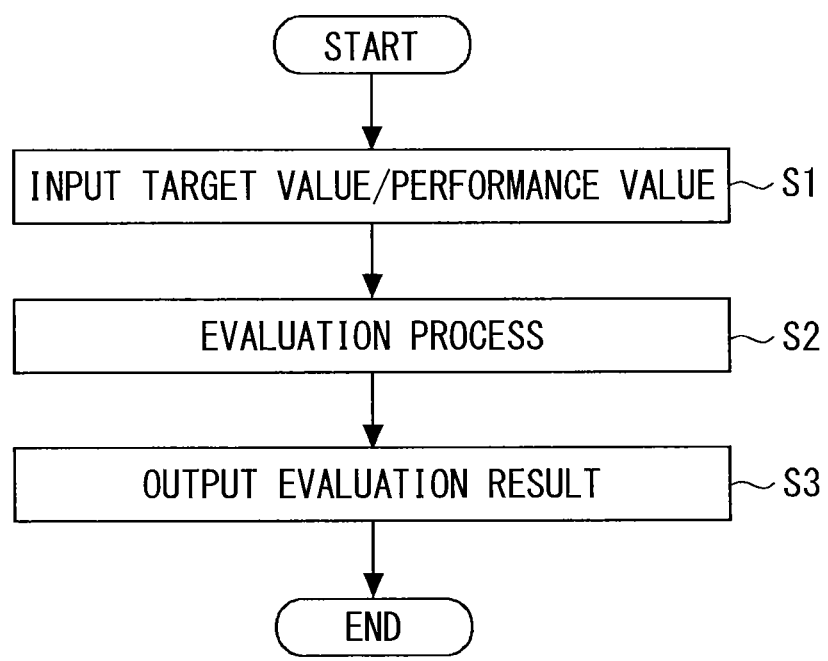
FIG. 21 is an explanatory flowchart of the evaluation method in a third embodiment, which is executed by the evaluation device in accordance with the evaluation program.

FIG. 21 is an explanatory flowchart of the evaluation method executed by the computer-based evaluation device 1 in accordance with the evaluation program.

In the evaluation device 1, upon receiving the boot command through the user's operation etc, the arithmetic processing unit 12 reads the evaluation program form the storage unit 13 and executes this evaluation program, thereby starting processes in FIG. 21.

To begin with, the target accepting unit 121 accepts inputting the target value of the MBA index, the target value of the MOT index and the target value of the MOS index, and stores these values in the storage unit 13 or the memory. Further, the performance accepting unit 122 accepts inputting the performance value of the MBA index, the performance value of the MOT index and the performance value of the MOS index, and stores these values in the storage unit 13 or the memory (step S1). As for inputting these performance values and the target values, the user may input these values by operating the input device such as the keyboard, and the data may also be inputted from other systems. For example, the performance value of the MBA index involves receiving the input of data of financial statements from an ERP (Enterprise Resource Planning) system. Note that the input accepting unit may be configured to, without being limited to receiving the data sent from other systems, read and thus acquire the data by accessing the databases etc of other systems.

Next, the evaluation unit 123 obtains the target vector of the enterprise value on the basis of the target value of the MBA index, the target value of the MOT index and the target value of the MOS index, which are inputted in step S1. Further, the evaluation unit 123 obtains the performance vector of the enterprise value on the basis of the performance value of the MBA index, the performance value of the MOT index and the performance value of the MOS index. Then, the evaluation unit 123 evaluates the enterprise value on the basis of the directions and the lengths of the target vector and the performance vector (step S2). Herein, the target vector of the enterprise value is defined on the three-dimensional coordinates, in which the three axes passing through the origin and orthogonal to each other are set, and these three axes are set as the MBA axis, the MOT axis and the MOS axis. On the three-dimensional coordinates, when the target value of the MBA index is taken on the MBA axis, the MBA target vector is a vector extending from the origin up to the target value of the MBA index. Similarly, when the target value of the MOT index is taken on the MOT axis, the MOT target vector is a vector extending from the origin up to the target value of the MOT index. Further, when the target value of the MOS index is taken on the MOS axis, the MOS target vector is a vector extending from the origin up to the target value of the MOS index. Then, the evaluation unit 123 obtains, as the target vector of enterprise value, the synthesized vector of the MBA target vector, the MOT target vector and the MOS target vector.

Moreover, when the performance value of the MBA index is taken on the MBA axis on the three-dimensional coordinates, the MBA performance vector is a vector extending from the origin up to the performance value of the MBA index. Similarly, when the performance value of the MOT index is taken on the MOT axis, the MOT performance vector is a vector extending from the origin up to the performance value of the MOT index. Furthermore, when the performance value of the MOS index is taken on the MOS axis, the MOS performance vector is a vector extending from the origin up to the performance value of the MOS index. Then, the evaluation unit 123 obtains, as the performance vector of enterprise value, the synthesized vector of the MBA performance vector, the MOT performance vector and the MOS performance vector.

Figure 22:
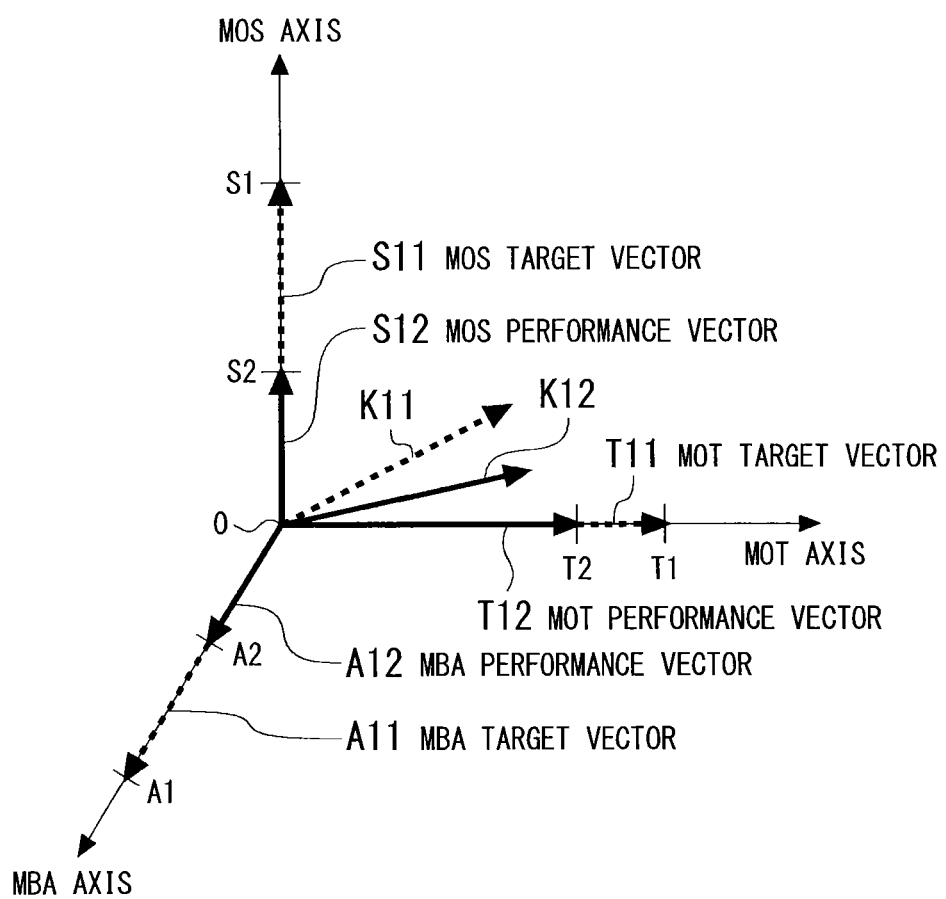
FIG. 22 is a diagram illustrating an example of displaying the target vector and the performance vector of the enterprise value on a display device.

Next, the output control unit 124 renders the target vector and the performance vector of the enterprise value on the three-dimensional coordinates by making a comparison between the target vector and the performance vector (step S3). FIG. 22 is a diagram illustrating an example of displaying the target vector and the performance vector of the enterprise value on the display device.

In the example of FIG. 22, a target value T1 of the MOT index and a performance value T2 of the MOT index are taken on the MOT axis, an arrow T11 represents the MOT target vector extending from an origin 0 up to the target value T1 of the MOT index, and an arrow T12 represents the MOT performance vector extending from the origin 0 up to the performance value T2 of the MOT index.

Further, a target value S1 of the MOS index and a performance value S2 of the MOS index are taken on the MOS axis, an arrow S11 represents the MOS target vector extending from the origin 0 up to the target value S1 of the MOS index, and an arrow S12 represents the MOS performance vector extending from the origin 0 up to the performance value S2 of the MOS index.

Moreover, a target value A1 of the MBA index and a performance value A2 of the MBA index are taken on the MBA axis, an arrow A11 represents the MBA target vector extending from the origin 0 up to the target value A1 of the MBA index, and an arrow A12 represents the MBA performance vector extending from the origin 0 up to the performance value A2 of the MBA index.

Then, the synthesized vector of the MBA target vector, the MOT target vector and the MOS target vector is obtained as the target vector of the enterprise value and is indicated by an arrow K11 on the three-dimensional coordinates in FIG. 22.

Furthermore, the synthesized vector of the MBA performance vector, the MOT performance vector and the MOS performance vector is obtained as the performance vector of the enterprise value and is indicated by an arrow K12 on the three-dimensional coordinates in FIG. 22.

Thus, in the example of FIG. 22, the target vector and the performance vector of the enterprise value can displayed on the same three-dimensional coordinates by making the comparison between the target vector and the performance vector, thereby enabling the directional divergence between the target vector and the performance vector to be visualized.

Figure 23:
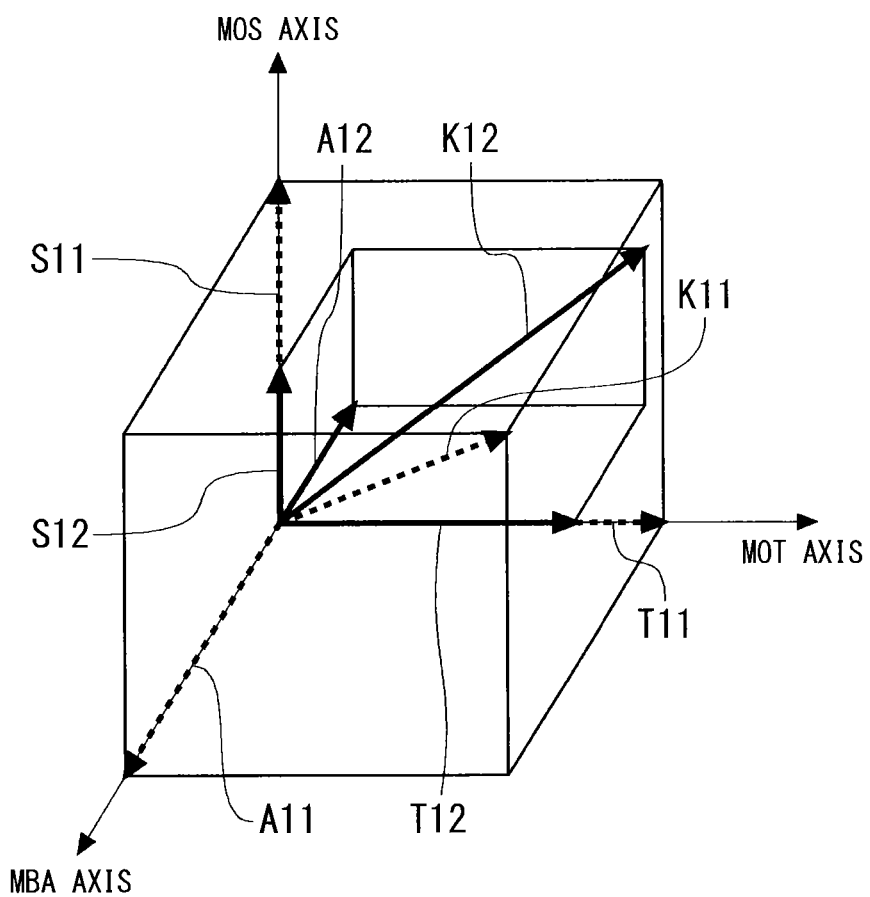
FIG. 23 is a diagram illustrating an example of how the performance value of the MBA index becomes minus.

FIG. 23 is a diagram illustrating an example of how the performance value of the MBA index becomes minus. The MBA performance vector has a negative direction, and hence the performance vector, defined as the synthesized vector, of the enterprise value deviates from a management target space in which the MBA axis, the MOT axis and the MOS axis are all equal to or larger than 0. In this case, the evaluation unit 123 gets the output control unit 124 to display an alarm message saying a purport of deviating from the management target space, and also display the arrow indicating the performance vector of the enterprise value in a predetermined color such as a red color implying the alarm.

Figure 24:
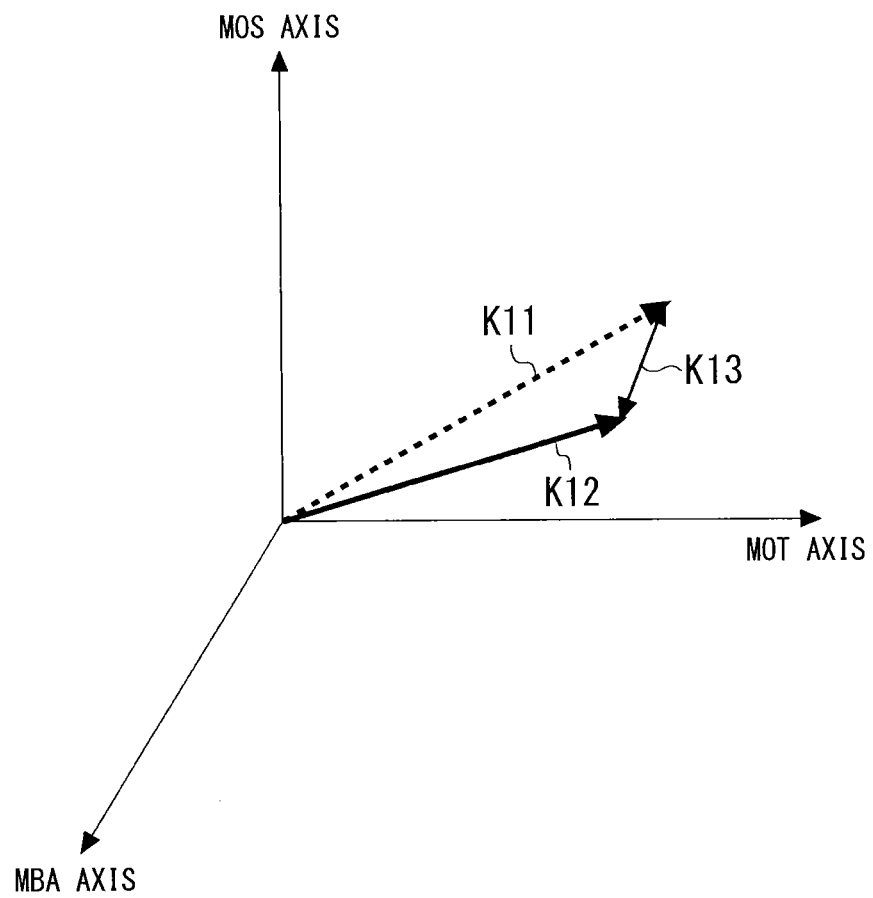
FIG. 24 is a diagram depicting a divergence between the target vector and the performance vector.

FIG. 24 is a diagram depicting the divergence between the target vector and the performance vector. The evaluation unit 123 obtains a distance K13 between the tip of the target vector of the enterprise value and the tip of the performance vector of the enterprise value, and evaluates as to whether the distance K13 is within the predetermined value or not. For example, the evaluation unit 123 makes an acceptable evaluation if the distance K13 is within the predetermined value, but issues the alarm if over the predetermined value.

Herein, if each of the target value of the MBA index, the target value of the MOT index and the target value of the MOS index is 10, the predetermined value is set to, e.g., 5, desirably 3 and more desirably 2.

Moreover, if each of the target value of the MBA index, the target value of the MOT index and the target value of the MOS index is 10, the length of the target vector of the enterprise value is $\sqrt{30}$, while the performance vector of the enterprise value has to be equal to or larger than 10. Hence, the predetermined value may be given by $(\sqrt{30})-10$.

Further, the evaluation unit 123 may deem, when evaluating the divergence between the tip of the target vector and the tip of the performance vector and if the performance value of the MBA index, or the MOT index or the MOS index exceeds the target value, the performance value of this index to be the same as the target value. Namely, the evaluation unit 123 restricts the length of the performance vector of each index down to the length of the target vector, then obtains the performance vector of the enterprise value by synthesizing the performance vectors of the respective indices, and may evaluate the divergence from the target vector. This being the case, when the performance value exceeds the target value with the result that the performance vector gets elongated, it is feasible to prevent the divergence from being evaluated negative because of the divergence being assumed to spread.

Figure 25:
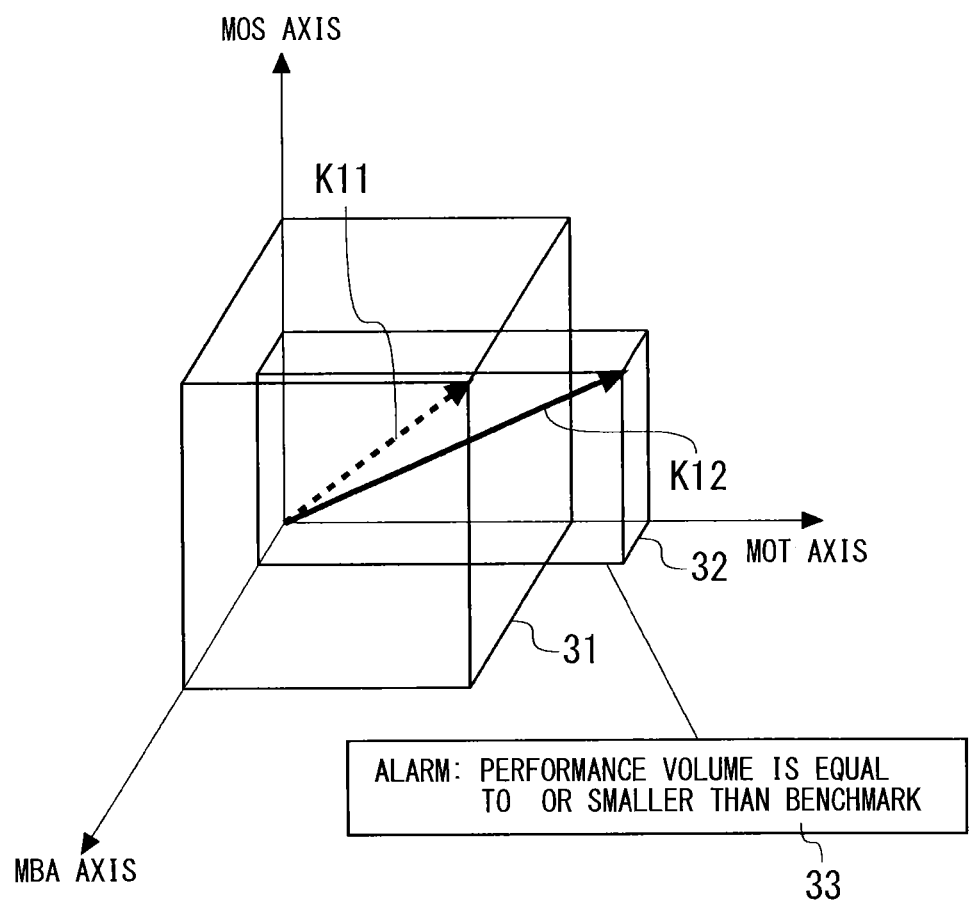
FIG. 25 is a diagram illustrating an example of comparing a volume of a rectangular parallelepiped in which the target vector of the enterprise value serves as a diagonal line with a volume of the rectangular parallelepiped in which the performance vector of the enterprise value serves as a diagonal line.

FIG. 25 is a diagram illustrating an example of comparing a volume of the rectangular parallelepiped in which the target vector of the enterprise value serves as a diagonal line with a volume of the rectangular parallelepiped in which the performance vector of the enterprise value serves as a diagonal line.

The evaluation unit 123 obtains a volume of a rectangular parallelepiped 31 having an apex given by the origin 0, sides given along the MBA axis, the MOT axis and the MOS axis and the diagonal line given by the target vector of the enterprise value, and sets the thus-obtained volume as a target volume. Further, the evaluation unit 123 obtains a volume of a rectangular parallelepiped 32 having an apex given by the origin, sides given along the MBA axis, the MOT axis and the MOS axis and the diagonal line given by the performance vector of the enterprise value, then sets the thus-obtained volume as a performance volume, and evaluates as to whether a difference between the target volume and the performance volume is within the predetermined value or not. Then, the evaluation unit 123, when determining that the performance volume is smaller than the target volume and that the difference therebetween exceeds the predetermined value, gets the output control unit 124 to output the alarm. For instance, the output control unit 124 is made to display a message 33 purporting that the performance value is too small.

It is thereby possible to determine whether a total attainment rates of the MBA index, the MOT index and the MOS index satisfies the benchmark (the predetermined value) or not.

Figure 26:
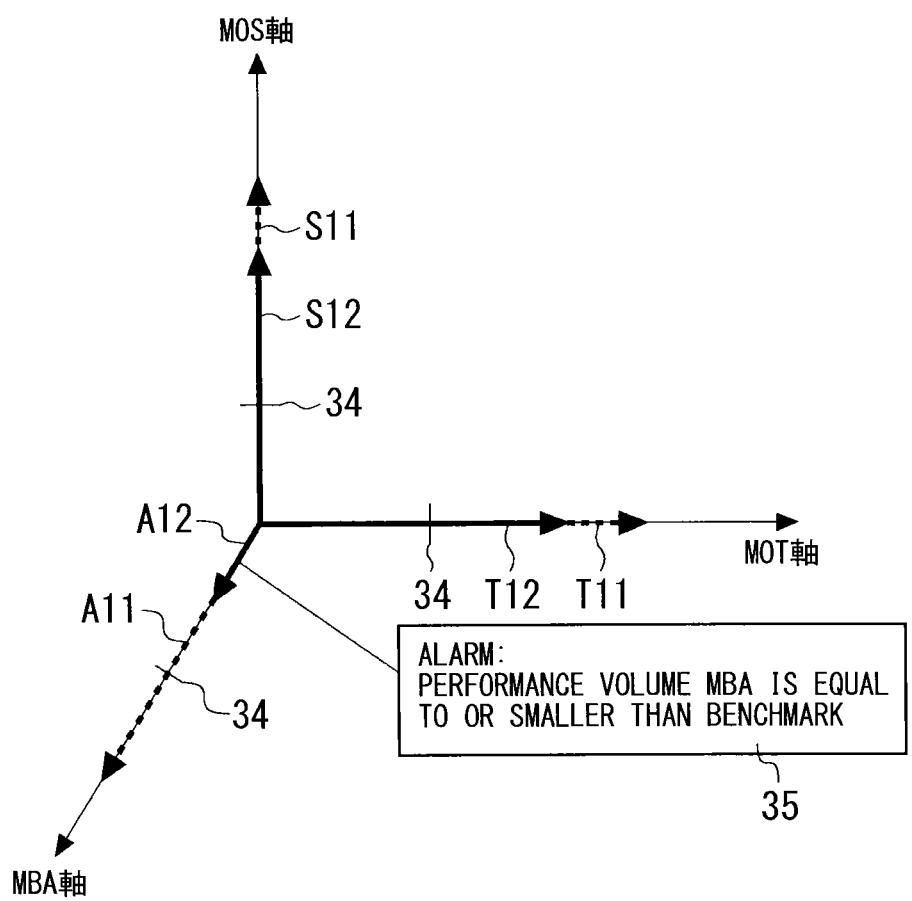
FIG. 26 is a diagram illustrating an example of evaluating the performance value of each axis.

FIG. 26 is a diagram illustrating an example of evaluating the performance value of each axis.

The evaluation unit 123 determines whether or not each of the performance value of the MBA index, the performance value of the MOT index and the performance value of the MOS index is smaller than the threshold value, and, if any one of the performance values is smaller than the threshold value, issues the alarm.

FIG. 26 illustrates a case in which the threshold value is 34 on each axis, and a performance vector A12 on the MBA axis is equal to or smaller than the threshold value 34. The evaluation unit 123, when determining that the performance value on any one of the axes is smaller than the threshold value, gets the output control unit 124 to output the alarm. For example, the output control unit 124 is made to display a message 35 purporting that the performance vector is too small.

Similarly, the evaluation unit 123 obtains, as the attainment rate, a rate of the performance value of the MBA index to the target value of the MBA index, or a rate of the performance value of the MOT index to the target value of the MOT index or a rate of the performance value of the MOS index to the target value of the MOS index. The evaluation unit 123 may get, when determining that this attainment rate is equal to or smaller than the predetermined value, the output control unit 124 to output the alarm.

Figure 27:
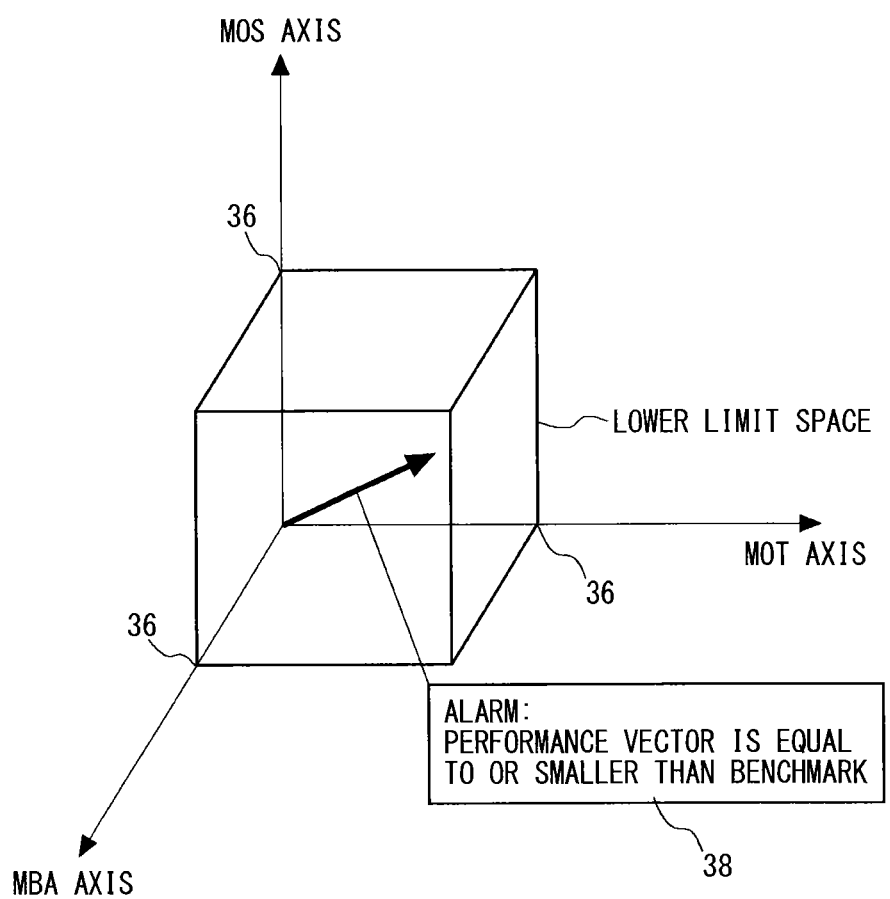
FIG. 27 is a diagram depicting an example of evaluating a length of the performance vector of the enterprise value.

FIG. 27 is a diagram depicting an example of evaluating the length of the performance vector of the enterprise value.

The evaluation unit 123 sets a threshold value 36 on each of the MBA axis, the MOT axis and the MOS axis, and defines, as a lower limit space 37, a rectangular parallelepiped having a side given by a straight line extending from the origin 0 up to the threshold value 36 on the MBA axis, a side given by a straight line extending from the origin 0 up to the threshold value 36 on the MOT axis and a side given by a straight line extending from the origin 0 up to the threshold value 36 on the MOS axis. Then, the evaluation unit 123 determines whether the tip of the performance vector of the enterprise value exceeds the lower limit space or not, and issues an alarm 38 if the tip of the performance vector of the enterprise value does not exceed the lower limit space.

Figure 28:
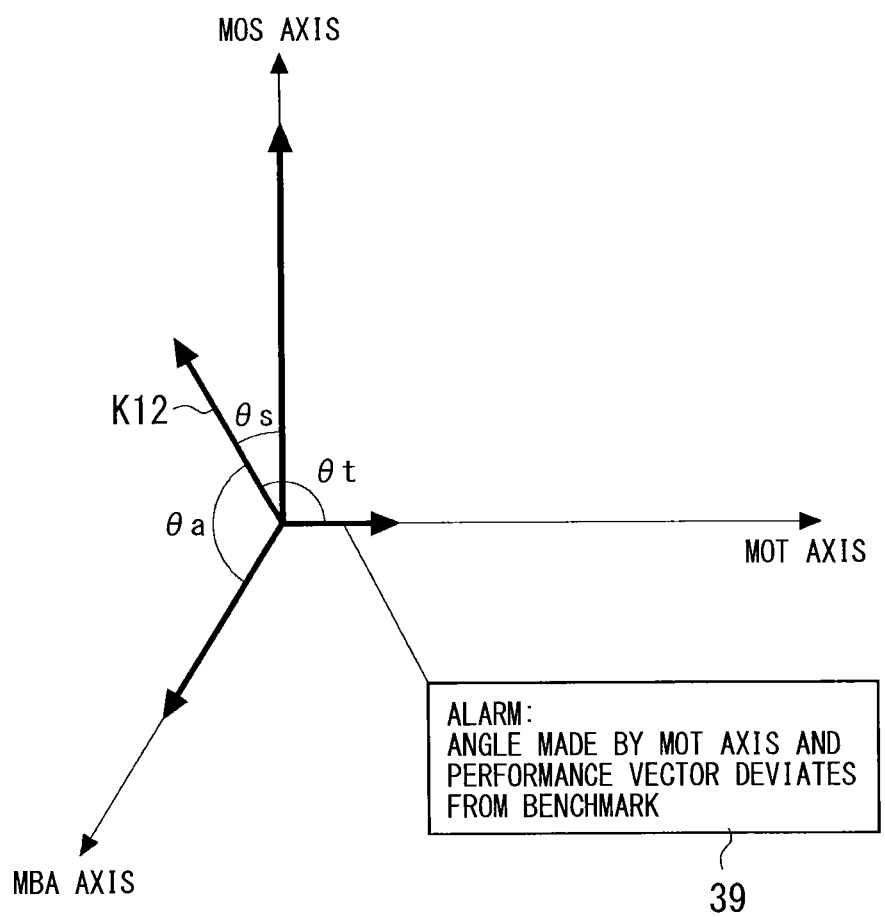
FIG. 28 is a diagram illustrating an example for evaluating a gradient of the performance vector of the enterprise value.

FIG. 28 is a diagram illustrating an example for evaluating a gradient of the performance vector of the enterprise value.

The evaluation unit 123 evaluates as to whether or not an angle θa made by the performance vector of the enterprise value and the MBA axis with the origin 0 serving as the apex is equal to or larger than the predetermined value. Further, the evaluation unit 123 evaluates as to whether or not an angle θt made by the performance vector of the enterprise value and the MOT axis with the origin 0 serving as the apex is equal to or larger than the predetermined value. The evaluation unit 123 evaluates as to whether or not an angle θs made by the performance vector of the enterprise value and the MOS axis with the origin 0 serving as the apex is equal to or larger than the predetermined value. Then, if any one of the angles θa, θt and θs is equal to or larger than the predetermined value, the evaluation unit 123 issues the alarm. FIG. 28 illustrates the example in which the MOT performance vector is short, the angle θt made by the performance vector of the enterprise value and the MOT axis exceeds the predetermined value, and an alarm message 39 is displayed.

The evaluation results illustrated in FIGS. 23-28 are poor, and the alarm is issued, in which case the resource allocation setting unit 127 changes the allocation of the estimated cost of the next time (e.g., the next fiscal year).

At first, the resource allocation setting unit 127 increases the preset resource value at the rate predetermined for attaining the purpose with respect to the index exhibiting the maximum divergence among the divergence between the performance value and the target value in the MBA index, the divergence between the performance value and the target value in the MOT index and the divergence between the performance value and the target value in the MOS index. For example, a 10% increase is set in a resource increase quantity as a setting parameter for the evaluation device 1, and the evaluation is executed. The evaluation device 1 increases the resource according to the setting parameter after executing the evaluation. For instance, if the estimated cost is 1 billion yen, the resource (fund) is raised to 1.1 billion yen. Note that the resource to be increased may be, without being limited to the fund, the persons (personnel) and the goods (assets). Furthermore, the combination of these elements is also available. Incidentally, the increasing rate may be arbitrarily set, and, for instance, a 5% increase or a 15% increase may be adopted.

The resource allocation setting unit 127 sets the resource allocation by reducing the value increased with respect to the larger divergence from the resource value preset with respect to the index exhibiting the minimum divergence. Alternatively, the resource allocation setting unit 127 sets the resource allocation by reducing the increased value from the resource value preset with respect to the index exhibiting the minimum divergence and from the resource value preset with respect to the index other than both of the index exhibiting the maximum divergence and the index exhibiting the minimum divergence. Note that the resource allocation setting unit 127 sets the resource allocation preferably by reducing the increased value from the resource value preset with respect to the index exhibiting the minimum divergence. For example, if the MOT index is the index exhibiting the maximum divergence and the MBA index is the index exhibiting the minimum divergence, the resource allocation setting unit 127 increases the resource value related to the MOT index by 10% but decreases the resource value related to the MBA index by 10%.

Note that, for instance, the performance of not only the MOT index but also the MOS index could be improved by increasing the resource allocation related to the MOT index in order to attain the target of the MOT index, and hence this point can be taken into consideration for reallocating the resources.

Thus, the evaluation device according to the third embodiment evaluates the business achievements of the enterprise three-dimensionally, then the alarm can be mechanically issued when the balance gets collapsed, and it is therefore feasible to prevent the management from being carelessly conducted while remaining ill-balanced and to support the healthy management of the enterprise.

While the invention has been described in detail and with reference to specific embodiments thereof, it will be apparent to one skilled in the art that various changes and modifications can be made therein without departing from the spirit and scope thereof.

What is claimed is:

1. An evaluation device for an enterprise value which comprises processing circuitry, comprising:
 a target accepting unit to accept inputting
  a target value of an MBA (Master of Business Administration) index calculated based on a predetermined value related to a business achievement of an enterprise and containing at least one of
   an operating profit attainment rate,
   an ROA (Return On Asset) attainment rate,
   a D/E (Debt/Equity) ratio attainment rate,
   a transformation attainment rate,
   a profitability per stock, and
   a total market value,
  a target value of an MOT (Management of Technology) index containing at least one of
   a resource investment rate into management of technology,
   a period target attainment rate of an activity related to the management of the technology, and
   an outcome rate from the activity related to the management of the technology, and
  a target value of an MOS (Management of Sustainability) index containing
   a comfort index defined as a degree of comfortability, including a degree of satisfaction of a stakeholder of the enterprise, to which an enterprise activity contributes, and
   a sustainability index defined as a determined value of how much a sustainable enterprise activity affects the environment;

a performance accepting unit to accept inputting a performance value of the MBA index, a performance value of the MOT index, and a performance value of the MOS index;

an evaluation unit to
set three axes passing through an origin and orthogonal to each other,
set the three axes as an MBA axis, an MOT axis, and an MOS axis,
take a target value of the MBA index, a target value of the MOT index, and a target value of the MOS index on the MBA axis, the MOT axis, and the MOS axis,
set an MBA target vector extending from the origin up to the target value of the MBA index, an MOT target vector extending from the origin up to the target value of the MOT index, and an MOS target vector extending from the origin up to the target value of the MOS index,
obtain a synthesized vector of the MBA target vector, the MOT target vector, and the MOS target vector as a target vector of the enterprise value,
further take a performance value of the MBA index, a performance value of the MOT index, and a performance value of the MOS index on the MBA axis, the MOT axis, and the MOS axis,
set an MBA performance vector extending from the origin up to the performance value of the MBA index, an MOT performance vector extending from the origin up to the performance value of the MOT index, and an MOS performance vector extending from the origin up to the performance value of the MOS index,
obtain a synthesized vector of the MBA performance vector, the MOT performance vector, and the MOS performance vector as a performance vector of the enterprise value, and
obtain a target vector of the enterprise value and a performance vector of the enterprise value with respect to a plurality of evaluation periods having a predetermined length, each of the plurality of evaluation periods being different in time, respectively;

a storage unit to store an allocation table including allocation rates associated with a difference between the target value and the performance value of the MBA index, a difference between the target value and the performance value of the MOT index, and a difference between the target value and the performance value of the MOS index;

a resource allocation setting unit, implemented by the processing circuitry, to
set one evaluation period in the plurality of evaluation periods as a first evaluation period,
set an evaluation period next to the first evaluation period as a second evaluation period,
increase a resource value set for attaining the target at the allocation rate given in the allocation table with respect to the index exhibiting the maximum difference between the performance value and the target value among the MBA index, the MOT index, and the MOS index of the first evaluation period when a distance between a tip of the performance vector and a tip of the target vector of the enterprise value in the first evaluation period diverges to a degree equal to or larger than the predetermined value, and
reset the resource value by reducing a resource value preset with respect to the index exhibiting the minimum difference or this resource value preset and a resource value preset with respect to the index other than the index exhibiting the maximum difference and the index exhibiting the minimum difference at the allocation rate given in the allocation table; and an output control unit to display a transition of the performance vector by rendering the target vectors of the enterprise value and the performance vectors of the enterprise value that are obtained with respect to the plurality of evaluation periods on three-dimensional coordinates defined by the MBA axis, the MOT axis, and the MOS axis, and output the reset resource value of the resource allocation setting unit.

2. The evaluation device for the enterprise value according to claim 1, further comprising:
a situation information collecting unit to acquire situation information on a situation from a predetermined information output source;
a storage unit to get stored with a weight table in which a per-scale length of at least one of the MBA axis, the MOT axis and the MOS axis is associated with the situation information; and
a scale determining unit to obtain the per-scale length of at least one of the MBA axis, the MOT axis, and the MOS axis associated with the situation information acquired by the situation information collecting unit by referring to the weight table,
wherein the scale determining unit determines a scale for every evaluation period by obtaining the per-scale length with respect to the plurality of evaluation periods, and
the output control unit renders the performance vectors of the enterprise value in the plurality of evaluation periods on the same three-dimensional coordinates on the basis of the scale for every evaluation period that is determined by the scale determining unit.

3. The evaluation device for the enterprise value according to claim 2, wherein the weight table is a table in which the situation information representing a fluctuation of the situation is associated with a scale ratio indicating a post-changing scale length against a pre-changing scale length, and a situation with an increasing fluctuation of a degree of difficulty for attainment is associated with the scale ratio at which to elongate a per-scale length.

4. The evaluation device for the enterprise value according to claim 2, wherein the weight table is a table in which the situation information representing the fluctuation of the situation is associated with the scale ratio indicating the post-changing scale length against the pre-changing scale length, and a situation with a decreasing fluctuation of the degree of difficulty for attainment is associated with the scale ratio at which to shorten a per-scale length.

5. The evaluation device for the enterprise value according to claim 1, wherein the evaluation unit obtains the performance vector of the enterprise value with respect to predetermined units of the evaluation periods, and
the output control unit displays a line graph formed by connecting apexes of the performance vectors with respect to the plurality of evaluation periods on the three-dimensional coordinates.

6. The evaluation device for the enterprise value according to claim 1, wherein the evaluation unit obtains the performance vector of the enterprise value with respect to predetermined units of the evaluation periods, and
the output control unit displays a performance volume by rendering a rectangular parallelepiped having sides given on the MBA axis, the MOT axis, and the MOS axis with an apex given by the origin on the three-dimensional coordinates and with a diagonal line given by the performance vector of the enterprise value, and displays transitions of the performance volume by rendering the rectangular parallelepiped with respect to the plurality of evaluation periods.

7. The evaluation device for the enterprise value according to 1, wherein threshold values are set respectively on the MBA axis, the MOT axis and,. the MOS axis,
a lower limit space is defined by a rectangular parallelepiped having a side given by a straight line extending from the origin up to the threshold value on the MBA axis, a side given by a straight line extending from the origin up to the threshold value on the MOT axis, and a side given by a straight line extending from the origin up to the threshold value on the MOS axis, and
the evaluation unit determines whether or not the tip of the performance vector of the enterprise value exceeds the lower limit space, and issues an alarm when the tip of the performance vector of the enterprise value does not exceed the lower limit space.

8. The evaluation device for the enterprise value according to claim 1, wherein when an angle made by the performance vector of the enterprise value with an apex given by the origin and the MBA axis, or an angle made by the performance vector of the enterprise value with the apex given by the origin and the MOT axis or an angle made by the performance vector of the enterprise value with the apex given by the origin and the MOS axis is equal to or larger than the predetermined value, the evaluation unit issues the alarm.

9. The evaluation device for the enterprise value according to claim 1, further comprising a target calculation unit to calculate a target per unit period,
wherein the target accepting unit accepts inputting target values after a lapse of a predetermined period with respect to the MOT index, the MOS index, and the MBA index, and
the target calculation unit segments a whole evaluation period till after the lapse of the predetermined period since a start of the evaluation on a per unit period basis, calculates the target value of the MOT index in each unit period on the basis of the target value of the MOT index after the lapse of the predetermined period, calculates the target value of the MOS index in each unit period on the basis of the target value of the MOS index after the lapse of the predetermined period, calculates the target value of the MBA index in each unit period on the basis of the target value of the MBA index after the lapse of the predetermined period, and obtains the target vector of the enterprise value from the target value of the MOT index, the target value of the MOS index and the target value of the MBA index in an arbitrary unit period.

10. An evaluation method for an enterprise value, comprising:
accepting inputting
a target value of an MBA (Master of Business Administration) index calculated based on a predetermined value related to a business achievement of an enterprise and containing at least one of
an operating profit attainment rate,
an ROA (Return On Asset) attainment rate,
a D/E (Debt/Equity) ratio attainment rate,
a transformation attainment rate,
a profitability per stock, and
a total market value,
a target value of an MOT (Management of Technology) index containing at least one of
a resource investment rate into management of technology,
a period target attainment rate of an activity related to the management of the technology, and
an outcome rate from the activity related to the management of the technology, and
a target value of an MOS (Management of Sustainability) index containing
a comfort index defined as a degree of comfortability, including a degree of satisfaction of a stakeholder of the enterprise, to which an enterprise activity contributes, and
a sustainability index defined as a determined value of how much a sustainable enterprise activity affects the environment;
accepting inputting a performance value of the MBA index, a performance value of the MOT index, and a performance value of the MOS index;
performing
setting three axes passing through an origin and orthogonal to each other,
setting the three axes as an MBA axis, an MOT axis, and an MOS axis,
taking a target value of the MBA index, a target value of the MOT index, and a target value of the MOS index on the MBA axis, the MOT axis, and the MOS axis,
setting an MBA target vector extending from the origin up to the target value of the MBA index, an MOT target vector extending from the origin up to the target value of the MOT index, and an MOS target vector extending from the origin up to the target value of the MOS index,
obtaining a synthesized vector of the MBA target vector, the MOT target vector, and the MOS target vector as a target vector of the enterprise value,
further taking a performance value of the MBA index, a performance value of the MOT index, and a performance value of the MOS index on the MBA axis, the MOT axis and the MOS axis,
setting an MBA performance vector extending from the origin up to the performance value of the MBA index, an MOT performance vector extending from the origin up to the performance value of the MOT index, and an MOS performance vector extending from the origin up to the performance value of the MOS index,
obtaining a synthesized vector of the MBA performance vector, the MOT performance vector, and the MOS performance vector as a performance vector of the enterprise value, and
obtaining a target vector of the enterprise value and a performance vector of the enterprise value with respect to a plurality of evaluation periods having a predetermined length, each of the plurality of evaluation periods being different in time, respectively;
storing an allocation table including allocation rates associated with a difference between the target value and the performance value of the MBA index, a difference between the target value and the performance value of the MOT index, and a difference between the target value and the performance value of the MOS index;
further performing, with processing circuitry,
setting one evaluation period in the plurality of evaluation periods as a first evaluation period,
setting set an evaluation period next to the first evaluation period as a second evaluation period,
increasing a resource value set for attaining the target at the allocation rate given in the allocation table with respect to the index exhibiting the maximum difference between the performance value and the target value among the MBA index, the MOT index, and the MOS index of the first evaluation period when a distance between a tip of the performance vector and a tip of the target vector of the enterprise value in the first evaluation period diverges to a degree equal to or larger than the predetermined value, and resetting the resource value by reducing a resource value preset with respect to the index exhibiting the minimum difference or this resource value preset and a resource value preset with respect to the index other than the index exhibiting the maximum difference and the index exhibiting the minimum difference at the allocation rate given in the allocation table; and displaying a transition of the performance vector by rendering the target vectors of the enterprise value and the performance vectors of the enterprise value that are obtained with respect to the plurality of evaluation periods on three-dimensional coordinates defined by the MBA axis, the MOT axis, and the MOS axis, and outputting the reset resource value.

11. A non-transitory recording medium recorded with an evaluation program for making a computer execute:

accepting inputting
a target value of an MBA (Master of Business Administration) index calculated based on a predetermined value related to a business achievement of an enterprise and containing at least one of
an operating profit attainment rate,
an ROA (Return On Asset) attainment rate, a D/E (Debt/Equity) ratio attainment rate,
a transformation attainment rate,
a profitability per stock, and
a total market value,
a target value of an MOT (Management of Technology) index containing at least one of
a resource investment rate into management of technology,
a period target attainment rate of an activity related to the management of the technology, and
an outcome rate from the activity related to the management of the technology, and
a target value of an MOS (Management of Sustainability) index containing
a comfort index defined as a degree of comfortability, including a degree of satisfaction of a stakeholder of the enterprise, to which an enterprise activity contributes, and
a sustainability index defined as a determined value of how much a sustainable enterprise activity affects the environment;

accepting inputting a performance value of the MBA index, a performance value of the MOT index, and a performance value of the MOS index;

performing
setting three axes passing through an origin and orthogonal to each other,
setting the three axes as an MBA axis, an MOT axis, and an MOS axis,
taking a target value of the MBA index, a target value of the MOT index, and a target value of the MOS index on the MBA axis, the MOT axis, and the MOS axis,
setting an MBA target vector extending from the origin up to the target value of the MBA index, an MOT target vector extending from the origin up to the target value of the MOT index, and an MOS target vector extending from the origin up to the target value of the MOS index, obtaining a synthesized vector of the MBA target vector, the MOT target vector, and the MOS target vector as a target vector of the enterprise value, further taking a performance value of the MBA index, a performance value of the MOT index, and a performance value of the MOS index on the MBA axis, the MOT axis, and the MOS axis, setting an MBA performance vector extending from the origin up to the performance value of the MBA index, an MOT performance vector extending from the origin up to the performance value of the MOT index, and an MOS performance vector extending from the origin up to the performance value of the MOS index, obtaining a synthesized vector of the MBA performance vector, the MOT performance vector, and the MOS performance vector as a performance vector of the enterprise value, and obtaining a target vector of the enterprise value and a performance vector of the enterprise value with respect to a plurality of evaluation periods having a predetermined length, each of the plurality of evaluation periods being different in time, respectively;

storing an allocation table including allocation rates associated with a difference between the target value and the performance value of the MBA index, a difference between the target value and the performance value of the MOT index, and a difference between the target value and the performance value of the MOS index;

further performing
setting one evaluation period in the plurality of evaluation periods as a first evaluation period,
setting an evaluation period next to the first evaluation period as a second evaluation period,
increasing a resource value set for attaining the target at the allocation rate given in the allocation table with respect to the index exhibiting the maximum difference between the performance value and the target value among the MBA index, the MOT index, and the MOS index of the first evaluation period when a distance between a tip of the performance vector and a tip of the target vector of the enterprise value in the first evaluation period diverges to a degree equal to or larger than the predetermined value, and
resetting the resource value by reducing a resource value preset with respect to the index exhibiting the minimum difference or this resource value preset and a resource value preset with respect to the index other than the index exhibiting the maximum difference and the index exhibiting the minimum difference at the allocation rate given in the allocation table; and displaying a transition of the performance vector by rendering the target vectors of the enterprise value and the performance vectors of the enterprise value that are obtained with respect to the plurality of evaluation periods on three-dimensional coordinates defined by the MBA axis, the MOT axis, and the MOS axis, and outputting the reset resource value.

12. An evaluation device for calculating an enterprise value comprising:
a processor; and
a memory storing instructions that cause the processor to perform:
accepting inputting
a target value of an MBA (Master of Business Administration) index calculated based on a predetermined value related to a business achievement of an enterprise and containing at least one of an operating profit attainment rate,
an ROA (Return On Asset) attainment rate,
a D/E (Debt/Equity) ratio attainment rate,
a transformation attainment rate,
a profitability per stock, and
a total market value,
a target value of an MOT (Master of Business Administration) index containing at least one of
   a resource investment rate into management of technology,
   a period target attainment rate of an activity related to the management of the technology, and
   an outcome rate from the activity related to the management of the technology, and
a target value of an MOS (Master of Sustainability) index containing
   a comfort index defined as a degree of comfortability, including a degree of satisfaction of a stakeholder of the enterprise, to which an enterprise activity contributes, and
   a sustainability index defined as a determined value of how much a sustainable enterprise activity affects the environment;
accepting inputting a performance value of the MBA index, a performance value of the MOT index, and a performance value of the MOS index;
performing
   setting three axes passing through an origin and orthogonal to each other,
   setting the three axes as an MBA axis, an MOT axis, and an MOS axis,
   taking a target value of the MBA index, a target value of the MOT index, and a target value of the MOS index on the MBA axis, the MOT axis, and the MOS axis,
   setting an MBA target vector extending from the origin up to the target value of the MBA index, an MOT target vector extending from the origin up to the target value of the MOT index, and an MOS target vector extending from the origin up to the target value of the MOS index,
   obtaining a synthesized vector of the MBA target vector, the MOT target vector, and the MOS target vector as a target vector of the enterprise value,
   further taking a performance value of the MBA index, a performance value of the MOT index, and a performance value of the MOS index on the MBA axis, the MOT axis, and the MOS axis,
   setting an MBA performance vector extending from the origin up to the performance value of the MBA index, an MOT performance vector extending from the origin up to the performance value of the MOT index, and an MOS performance vector extending from the origin up to the performance value of the MOS index,
   obtaining a synthesized vector of the MBA performance vector, the MOT performance vector, and the MOS performance vector as a performance vector of the enterprise value, and
   obtaining a target vector of the enterprise value and a performance vector of the enterprise value with respect to a plurality of evaluation periods having a predetermined length, each of the plurality of evaluation periods being different in time, respectively;
storing an allocation table including allocation rates associated with a difference between the target value and the performance value of the MBA index, a difference between the target value and the performance value of the MOT index, and a difference between the target value and the performance value of the MOS index;
further performing, by the processor,
   setting one evaluation period in the plurality of evaluation periods as a first evaluation period,
   setting an evaluation period next to the first evaluation period as a second evaluation period,
   increasing a resource value set for attaining the target at the allocation rate given in the allocation table with respect to the index exhibiting the maximum difference between the performance value and the target value among the MBA index, the MOT index, and the MOS index of the first evaluation period when a distance between a tip of the performance vector and a tip of the target vector of the enterprise value in the first evaluation period diverges to a degree equal to or larger than the predetermined value, and
   resetting the resource value by reducing a resource value preset with respect to the index exhibiting the mininum difference or this resource value preset and a resource value preset with respect to the index other than the index exhibiting the maximum difference and the index exhibiting the mininum difference at the allocation rate given in the allocation table; and
displaying a transition of the performance vector by rendering the target vectors of the enterprise value and the performance vectors of the enterprise value that are obtained with respect to the plurality of evaluation periods on three-dimensional coordinates defined by the MBA axis, the MOT axis, and the MOS axis, and outputting the reset resource value.

* * * * *